US012665645B2

(12) United States Patent
Yao et al.

(10) Patent No.: US 12,665,645 B2
(45) Date of Patent: Jun. 23, 2026

(54) SIGNAL TRANSMISSION METHOD AND APPARATUS, DEVICE, AND SYSTEM

(71) Applicant: VIVO MOBILE COMMUNICATION CO., LTD., Dongguan (CN)

(72) Inventors: Jian Yao, Dongguan (CN); Dajie Jiang, Dongguan (CN); Na Li, Dongguan (CN); Kaili Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 302 days.

(21) Appl. No.: 18/528,752

(22) Filed: Dec. 4, 2023

(65) Prior Publication Data

US 2024/0106509 A1 Mar. 28, 2024

Related U.S. Application Data

(63) Continuation of application No. PCT/CN2022/095976, filed on May 30, 2022.

(30) Foreign Application Priority Data

Jun. 4, 2021 (CN) .......................... 202110624841.X

(51) Int. Cl.
*H04B 7/06* (2006.01)
*H04L 1/00* (2006.01)
(Continued)

(52) U.S. Cl.
CPC ......... *H04B 7/0632* (2013.01); *H04L 1/0003* (2013.01); *H04W 72/11* (2023.01); *H04W 72/231* (2023.01)

(58) Field of Classification Search
CPC .. H04B 7/0632; H04W 72/231; H04W 72/11; H04L 1/0003
See application file for complete search history.

(56) References Cited

U.S. PATENT DOCUMENTS

2018/0160441 A1 6/2018 Egner et al.
2019/0058517 A1* 2/2019 Kang ................... H04B 7/0456
(Continued)

FOREIGN PATENT DOCUMENTS

| CN | 108111197 A | 6/2018 |
| CN | 110446226 A | 11/2019 |
| WO | 2021047279 A1 | 3/2021 |

OTHER PUBLICATIONS

International Search Report issued in corresponding International Application No. PCT/CN2022/095976, mailed Aug. 11, 2022, 4 pages.

*Primary Examiner* — Jael M Ulysse
(74) *Attorney, Agent, or Firm* — IPX PLLC

(57) ABSTRACT

A signal transmission method and apparatus, a device, and a system are provided. The signal transmission method includes: sending first signaling to a receive end device, where the first signaling is used to indicate configuration information of a first signal; and the configuration information includes at least one of the following: first information, a signal waveform, a target measurement quantity, or signal sequence information, where the first information is used to indicate a signal type of the first signal, or indicate whether the receive end device detects communication information of the first signal; and the target measurement quantity includes a measurement quantity to be measured or fed back by the receive end device.

19 Claims, 7 Drawing Sheets

(51) Int. Cl.
*H04W 72/11* (2023.01)
*H04W 72/231* (2023.01)

(56) References Cited

U.S. PATENT DOCUMENTS

| | | | | |
|---|---|---|---|---|
| 2020/0028609 | A1* | 1/2020 | Ahn | H04W 24/10 |
| 2020/0119797 | A1* | 4/2020 | Wang | H04B 7/0632 |
| 2020/0137606 | A1* | 4/2020 | Jiang | H04L 5/0057 |
| 2021/0076367 | A1* | 3/2021 | Bayesteh | H04W 4/70 |
| 2022/0029676 | A1* | 1/2022 | Ramireddy | H04B 7/0626 |
| 2023/0156787 | A1* | 5/2023 | Dai | H04L 5/0012 |
| | | | | 370/329 |
| 2023/0319822 | A1* | 10/2023 | Park | H04W 72/11 |
| | | | | 370/329 |
| 2024/0340062 | A1* | 10/2024 | Großmann | H04B 7/0478 |

* cited by examiner

SIGNAL TRANSMISSION METHOD AND APPARATUS, DEVICE, AND SYSTEM

CROSS-REFERENCE TO RELATED APPLICATIONS

This application is a continuation of International Application No. PCT/CN2022/095976, filed May 30, 2022, which claims priority to Chinese Patent Application No. 202110624841.X, filed Jun. 4, 2021. The entire contents of each of the above-referenced applications are expressly incorporated herein by reference.

TECHNICAL FIELD

Embodiments of the present application relate to the field of communications technologies, and in particular, to a signal transmission method and apparatus, a device, and a system.

BACKGROUND

An integrated communication and sensing system is a system designed with integrated communication and sensing functions through spectrum sharing and/or hardware sharing. The integrated communication and sensing system can not only transmit a signal, but also sense information such as an azimuth, a distance, and a speed, and can detect, track, and recognize a target device or an event by using a sensing signal. It can be learned that, in comparison with a stand-alone communication system and a standalone sensing system, the integrated communication and sensing system can reduce costs, reduce sizes, reduce power consumption, improve spectrum efficiency, reduce mutual interference, and so on, thereby improving overall performance of the system.

However, in the integrated communication and sensing system, due to spectrum sharing and/or hardware sharing between the communication system and the sensing system, a receive end device needs to know a signal format (for example, a signal type, a signal waveform, or a signal resource configuration) of a signal (hereinafter referred to as signal 1) sent by a transmit end, before differentiated processing can be performed on signal 1.

However, there is no unified standard for signal formats of communication signals, sensing signals, and integrated communication and sensing signals. Therefore, how to improve efficiency of signal processing of the receive end device and reduce complexity of signal processing of the receive end device in the integrated communication and sensing system is a problem that needs to be resolved.

SUMMARY

Embodiments of the present application provide a signal transmission method and apparatus, and a device.

According to a first aspect, a signal transmission method is provided, and is applied to a transmit end device. The method includes: sending first signaling to a receive end device, where the first signaling is used to indicate configuration information of a first signal; and the configuration information includes at least one of the following: first information, a signal waveform, a target measurement quantity, or signal sequence information, where the first information is used to indicate a signal type of the first signal, or indicate whether the receive end device detects communication information of the first signal; and the target measurement quantity includes a measurement quantity to be measured and/or fed back by the receive end device.

According to a second aspect, a signal transmission method is provided, and is applied to a receive end device. The method includes: receiving first signaling sent by a transmit end device, where the first signaling is used to indicate configuration information of a first signal, and the configuration information is used by the receive end device to process the first signal; and the configuration information includes at least one of the following: first information, a signal waveform, a target measurement quantity, or signal sequence information, where the first information is used to indicate a signal type of the first signal, or indicate whether the receive end device detects communication information of the first signal; a first resource configuration includes at least one of a time-frequency resource configuration or a space resource configuration; and the target measurement quantity includes a measurement quantity to be measured and/or fed back by the receive end device.

According to a third aspect, a signal transmission apparatus is provided. The signal transmission apparatus includes a sending module. The sending module is configured to send first signaling to a receive end device, where the first signaling is used to indicate configuration information of a first signal; and the configuration information includes at least one of the following: first information, a signal waveform, a target measurement quantity, or signal sequence information, where the first information is used to indicate a signal type of the first signal, or indicate whether the receive end device detects communication information of the first signal; and the target measurement quantity includes a measurement quantity to be measured and/or fed back by the receive end device.

According to a fourth aspect, a signal transmission apparatus is provided. The signal transmission apparatus includes a receiving module. The receiving module is configured to receive first signaling sent by a transmit end device, where the first signaling is used to indicate configuration information of a first signal, and the configuration information is used by a receive end device to process the first signal; and the configuration information includes at least one of the following: first information, a signal waveform, a target measurement quantity, or signal sequence information, where the first information is used to indicate a signal type of the first signal, or indicate whether the receive end device detects communication information of the first signal; a first resource configuration includes at least one of a time-frequency resource configuration or a space resource configuration; and the target measurement quantity includes a measurement quantity to be measured and/or fed back by the receive end device.

According to a fifth aspect, a transmit end device is provided. The transmit end device includes a processor, a memory, and a program or instructions stored in the memory and capable of running on the processor. When the program or instructions are executed by the processor, the steps of the method according to the first aspect are implemented.

According to a sixth aspect, a receive end device is provided. The receive end device includes a processor, a memory, and a program or instructions stored in the memory and capable of running on the processor. When the program or instructions are executed by the processor, the steps of the method according to the second aspect are implemented.

According to a seventh aspect, a transmit end device is provided. The transmit end device includes a processor and a communication interface. The communication interface is configured to send first signaling to a receive end device, where the first signaling is used to indicate configuration information of a first signal; and the configuration information includes at least one of the following: first information, a signal waveform, a target measurement quantity, or signal sequence information, where the first information is used to indicate a signal type of the first signal, or indicate whether the receive end device detects communication information of the first signal; and the target measurement quantity includes a measurement quantity to be measured and/or fed back by the receive end device.

According to an eighth aspect, a receive end device is provided. The receive end device includes a processor and a communication interface. The communication interface is configured to receive first signaling sent by a transmit end device, where the first signaling is used to indicate configuration information of a first signal, and the configuration information is used by the receive end device to process the first signal; and the configuration information includes at least one of the following: first information, a signal waveform, a target measurement quantity, or signal sequence information, where the first information is used to indicate a signal type of the first signal, or indicate whether the receive end device detects communication information of the first signal; a first resource configuration includes at least one of a time-frequency resource configuration or a space resource configuration; and the target measurement quantity includes a measurement quantity to be measured and/or fed back by the receive end device.

According to a ninth aspect, a readable storage medium is provided. The readable storage medium stores a program or instructions. When the program or instructions are executed by a processor, the steps of the method according to the first aspect are implemented, or the steps of the method according to the second aspect are implemented.

According to a tenth aspect, a chip is provided. The chip includes a processor and a communication interface. The communication interface is coupled to the processor. The processor is configured to run a program or instructions to implement the method according to the first aspect or implement the method according to the second aspect.

According to an eleventh aspect, a computer program or program product is provided. The computer program or program product is stored in a non-volatile storage medium. The computer program or program product is executed by at least one processor to implement the steps of the signal transmission method according to the first aspect or implement the steps of the signal transmission method according to the second aspect.

In the embodiments of this application, the transmit end device may send the first signaling to the receive end device, and the receive end device may receive the first signaling, where the first signaling is used to indicate the configuration information of the first signal; and the configuration information may include at least one of the following: the first information, the signal waveform, the target measurement quantity, or the signal sequence information, where the first information may be used to indicate the signal type of the first signal, or the first information may be used to indicate whether the receive end device detects the communication information of the first signal; and the target measurement quantity may include the measurement quantity to be measured and/or fed back by the receive end device. According to this solution, because the transmit end device can send the first signaling indicating the configuration information of the first signal to the receive end device, after the receive end device receives the first signaling, the receive end device can perform differentiated processing on the first signal according to the indication of the first signaling, thereby improving efficiency of signal processing of the receive end device and reducing complexity of processing.

DETAILED DESCRIPTION

Figure 1:
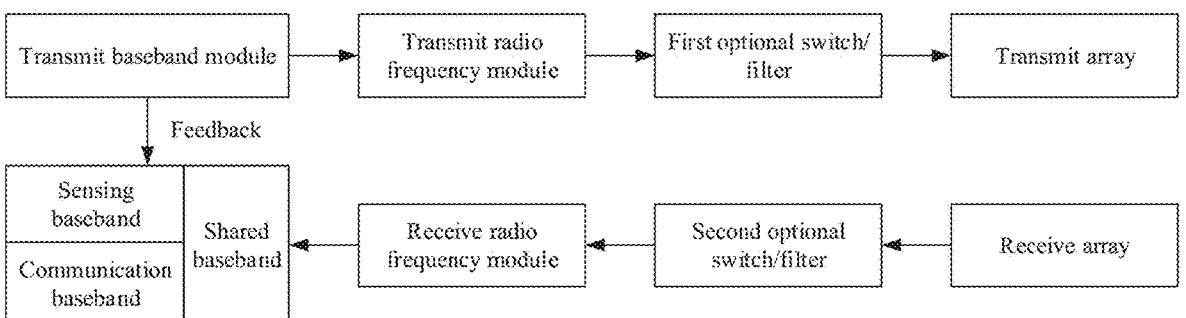
FIG. 1 is a block diagram of an integrated communication and sensing system according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a Long Term Evolution (LTE)/LTE-Advanced (LTE-A) system, and can also be used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the New Radio (NR) system is described for an illustrative purpose, and NR terms are used in most of the following descriptions. These technologies may also be applied to other systems than an NR system, for example, a 6th Generation (6G) communication system.

The embodiments of this application provide a signal transmission method in an integrated communication and sensing scenario, so that the receive end device can perform differentiated processing on a communication signal, a sensing signal, and an integrated communication and sensing signal, thereby improving efficiency of signal processing of the receive end device and reducing complexity of processing.

An integrated communication and sensing system is designed with integrated communication and sensing functions through spectrum sharing and/or hardware sharing. The integrated communication and sensing system can not only transmit signals, but also sense information such as an azimuth, a distance, and a speed, to detect, track, and recognize an object, an environment, or an event. In the integrated communication and sensing system, a communication system and a sensing system can complement each other to reduce costs, reduce system sizes, reduce power consumption, improve spectrum efficiency, reduce mutual interference, and so on, thereby improving overall performance of the system.

Feasibility of the integrated communication and sensing system is mainly reflected in the following aspects:

First, both the communication system and the sensing system are based on an electromagnetic wave theory, and use emission and reception of electromagnetic waves to complete acquisition and transmission of information. Second, both the communication system and the sensing system have structures such as antennas, transmit end devices, receive end devices, and signal processors, that is, the communication system and the sensing system have a large overlap in hardware resources.

Furthermore, with development of technologies, the communication system and the sensing system also have more overlaps in operating frequency bands.

In addition, the communication system and the sensing system also have similarities in key technologies such as signal modulation, reception and detection, and waveform design.

For example, an integrated communication and radar system is a typical application of the integrated communication and sensing system.

In conventional technologies, a radar system and a communication system are strictly distinguished due to different research objects and focuses, that is, in most scenarios, the radar system and the communication system are researched separately. However, because both the radar system and the communication system are typical systems for sending, obtaining, processing, and exchanging information, and there are many similarities between the radar system and the communication system in operating principles, system architectures, and operating frequency bands, there is great feasibility of designing an integrated communication and radar system.

Currently, an implementation of the integrated communication and radar system includes any one of the following:

Spectrum coexistence: To be specific, the communication system and the radar system work independently, and may be allowed to exchange information to reduce mutual interference.

Receive end sharing: To be specific, the communication system and the radar system share a receive end device. In some embodiments, a transmit end device of the communication system may send a communication signal, a transmit end device of the radar system may send a radar signal, and a signal waveform of the communication signal is orthogonal to a signal waveform of the radar signal, thereby ensuring that the receive end device can accurately receive the communication signal and the radar signals. In other words, transmit ends of the two systems send their signals, and the waveforms of the signals sent by the two systems are orthogonal. Therefore, reception and detection of the radar signal and the communication signal by the receive end device are not affected.

Transmit end sharing: To be specific, the communication system and the radar system share a transmit end device. In some embodiments, the transmit end device may send a joint waveform of a radar signal and a communication signal; then a receive end device of the communication system may receive the joint waveform, and detect the communication signal from the joint waveform; and correspondingly, a receive end device of the radar system may receive the joint waveform, and detect the radar signal from the joint waveform.

Receive and transmit end sharing: To be specific, the communication system and the radar system share a transmit end device and a receive end device, that is, the two systems share resources on both transmit and receive sides. In some embodiments, the transmit end device may send a joint waveform of a radar signal and a communication signal, or separately send a communication signal and a radar signal whose waveforms have an orthogonality relation.

FIG. 1 is a block diagram of an integrated communication and sensing system according to an embodiment of this application. As shown in FIG. 1, in the integrated communication and sensing system, a radio frequency module is generally reused as a common module, such as a transmit radio frequency (Tx Radio Frequency, Tx RF) module, a first optional switch/filter, a transmit array (Tx Array), a receive array (Rx Array), a second optional switch/filter, and a receive radio frequency (Rx Radio Frequency, Rx RF) module in FIG. 1. A part of modules in a baseband processor, such as a shared baseband module in FIG. 1, may be configured to process both a communication signal and a sensing signal. Another part of modules in the baseband processor, such as a communication baseband module and a sensing baseband module in FIG. 1, may be configured to process a communication signal or a sensing signal.

Figure 2:
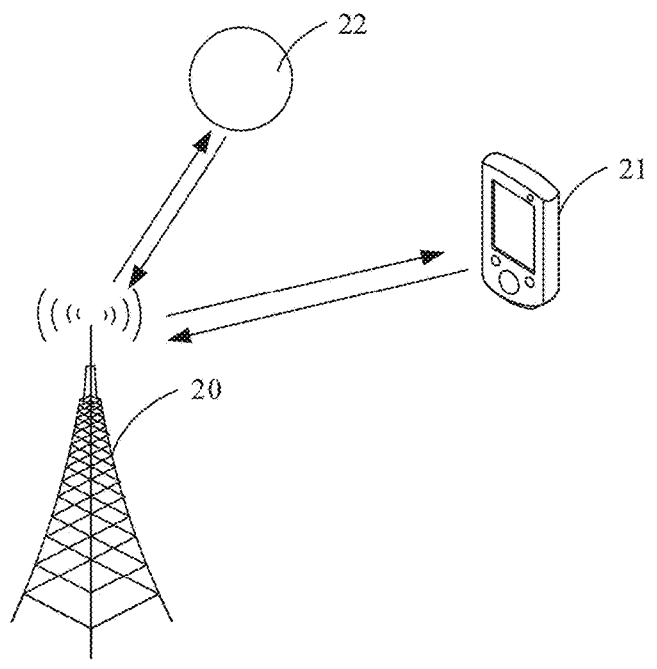
FIG. 2 is a schematic diagram of an architecture of a sensing system based on a single-station mode according to an embodiment of this application.

When the integrated communication and sensing system performs sensing, (1) the integrated communication and sensing system may be used as a sensing system based on a single-station mode, that is, transmit-and-receive co-location. In some embodiments, a transmit end device in the integrated communication and sensing system transmits a sensing signal, and then the transmit end device itself receives an echo signal and analyzes the received echo signal to extract a sensing parameter from the echo signal. As shown in a schematic diagram of a sensing system based on a single-station mode in FIG. 2, a base station 01 serves as a transmit end device and a receive end device for a sensing signal, and user equipment (UE) 02 or another object 03 serves as a sensing target.

Figure 3:
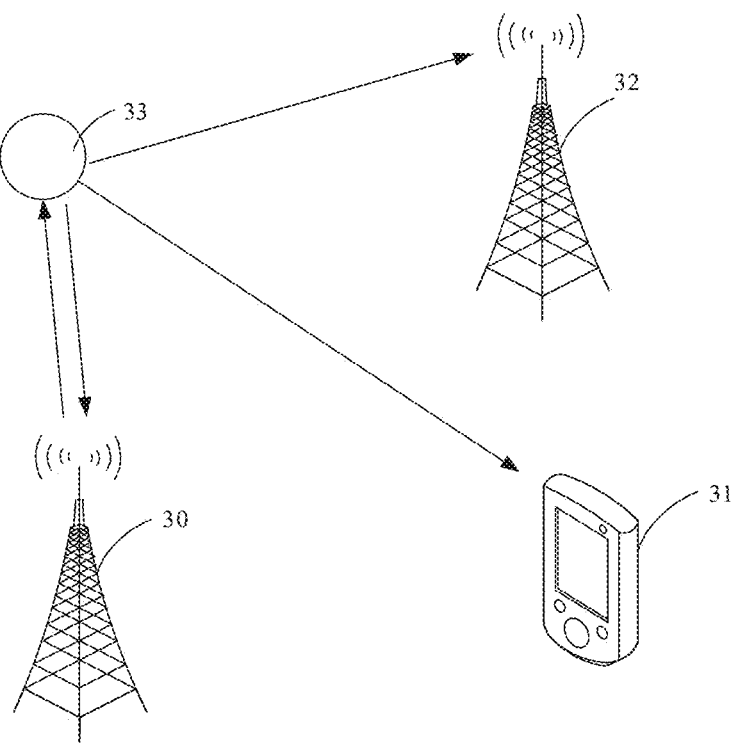
FIG. 3 is a schematic diagram of an architecture of a sensing system based on a dual-station or multi-station mode according to an embodiment of this application.

In some embodiments, (2) the integrated communication and sensing system may be used as a sensing system based on a dual-station or multi-station mode, that is, transmit-and-receive non-co-location. In some embodiments, a transmit end device in the integrated communication and sensing system transmits a sensing signal, and a receive end device in the integrated communication and sensing system receives the sensing signal and analyzes the received sensing signal to extract a sensing parameter from the received sensing signal. As shown in a schematic diagram of a sensing system based on a dual-station or multi-station mode in FIG. 3, a base station 04 serves as a transmit end device for a sensing signal, user equipment UE 05 or a base station 06 serves as a receive end for the sensing signal, and at least one (such as an object 07) of an object, an environment, and an event other than the base station 04, the UE 05, and the base station 06 serves as a sensing target.

The UE may also be referred to as a terminal device or a terminal. The UE may be a terminal-side device such as a mobile phone, a tablet computer, a laptop computer or a notebook computer, a Personal Digital Assistant (PDA), a palmtop computer, a netbook, an Ultra-Mobile Personal Computer (UMPC), a mobile Internet device (MID), a wearable device, a vehicular user equipment (VUE), or a pedestrian user equipment (PUE). The wearable device includes a smart watch, a smart band, an earphone, glasses, or the like. It should be noted that a specific type of the UE is not limited in the embodiments of this application. The base station may be referred to as a NodeB, an evolved NodeB, an access point, a Base Transceiver Station (BTS), a radio base station, a radio transceiver, a Basic Service Set (BSS), an Extended Service Set (ESS), a home NodeB, a home evolved NodeB, a WLAN access point, a Wi-Fi node, a Transmission and Reception Point (TRP), or another appropriate term in the art. As long as the same technical effect is achieved, the base station is not limited to specific technical terms. It should be noted that in the embodiments of this application, only a base station in an NR system is used as an example, but a specific type of the base station is not limited.

It should be noted that, in the integrated communication and sensing system, the receive end device needs to know a type and a signal format of a signal sent by the transmit end device, before differentiated processing can be performed on the signal sent by the transmit end device. If the receive end device is used as a receive end in the sensing system based on the dual-station or multi-station mode, the receive end device needs to receive a sensing signal and analyze and process the sensing signal, to obtain a sensing parameter. If the receive end device is not used as a receive end in the sensing system based on the dual-station or multi-station mode, or the transmit end device works in the single-station sensing mode, the receive end device does not need to receive a sensing signal.

Currently, research on the integrated communication and sensing system is still immature, and there is no unified standard for signal formats of communication signals, sensing signals, and integrated communication and sensing signals in the integrated communication and sensing system. Therefore, how to improve efficiency of signal processing of the receive end device and reduce complexity of signal processing of the receive end device in the integrated communication and sensing system is a problem that needs to be resolved.

In the signal transmission method provided in the embodiments of this application, the transmit end device may send signaling to the receive end device to indicate configuration information of a signal (such as a first signal in the embodiments of this application) to be sent by the transmit end device. Therefore, after receiving the signaling, the receive end device can perform differentiated processing on the first signal according to the configuration information indicated by the signaling (the configuration information is described in detail in the following embodiments). In this way, efficiency of signal processing of the receive end device in the integrated communication and sensing system can be improved, and complexity of signal processing of the receive end device can be reduced.

The signal transmission method provided in the embodiments of this application is hereinafter described in detail by using embodiments and application scenarios thereof with reference to the accompanying drawings.

Figure 4:
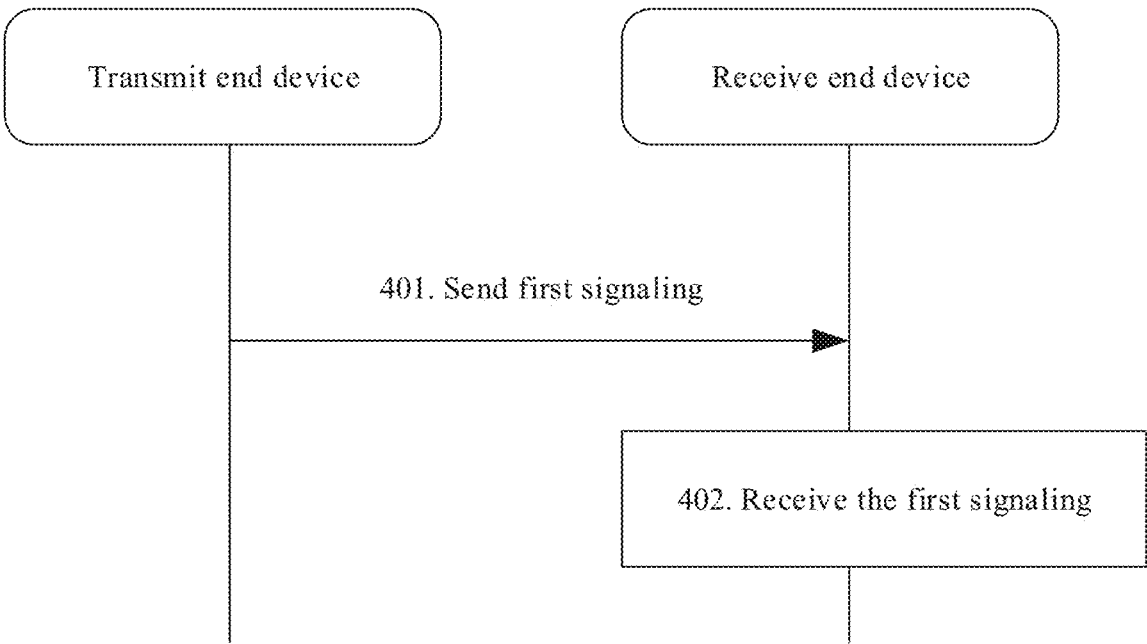
FIG. 4 is a schematic diagram of a signal transmission method according to an embodiment of this application.

An embodiment of this application provides a signal transmission method. FIG. 4 is a schematic diagram of a signal transmission method according to an embodiment of this application. As shown in FIG. 4, the signal transmission method provided in this embodiment of this application may include the following step 401 and step 402.

Step 401: A transmit end device sends first signaling to a receive end device.

Step 402: The receive end device receives the first signaling sent by the transmit end device.

In this embodiment of this application, the first signaling may be used to indicate configuration information of a first signal, and the configuration information may be used by the receive end device to process the first signal.

In this embodiment of this application, that the transmit end device sends the first signaling to the receive end device may be understood as "the transmit end device notifies the receive end device of the configuration information of the first signal by using the first signaling".

In some embodiments of this application, the first signal may be a signal to be sent by the transmit end device in a target time unit.

In some embodiments of this application, the target time unit may include one or more time units. In a case that the target time unit includes a plurality of time units, the plurality of time units may be continuous time units, or may be discontinuous time units.

In some embodiments, the time unit in this embodiment of this application may be at least one of the following: a Transmission Time Interval (TTI), a slot, or a sub-slot.

In some embodiments of this application, the configuration information of the first signal may include at least one of the following a, b, c, or d:

a. first information; b. a signal waveform of the first signal; c. a target measurement quantity; or d. signal sequence information of the first signal.

The following describes a, b, c, and d separately by using examples.

a. First Information

The first information is used to indicate a signal type of the first signal, or the first information is used to indicate whether the receive end device detects communication information of the first signal.

It should be noted that, that the first information indicates whether the receive end device detects the communication information of the first signal and that the first information indicates the signal type of the first signal can achieve a same effect. In other words, that the first information indicates whether the receive end device detects the communication information of the first signal is a manner of implicitly indicating the signal type of the first signal.

In some embodiments of this application, the first signal may include at least one of the following types of signals: a sensing signal, a communication signal, or an integrated communication and sensing signal.

The communication signal refers to a signal used only for information transmission between the transmit end device and the receive end device; the sensing signal refers to a signal used only for implementing a sensing function, for example, sensing a target object, event, or environment; and the integrated communication and sensing signal is a signal that may be used not only for information transmission between the transmit end device and the receive end device, but also for implementing the sensing function.

For example, the sensing signal may be a radar signal.

For example, the communication signal may be a Single Side Band (SSB), a Tracking Reference signal (TRS), or a DeModulation Reference Signal (DMRS).

b. Signal Waveform of the First Signal

In some embodiments of this application, the signal waveform of the first signal may include at least one of the following: an Orthogonal Frequency Division Multiplexing (OFDM) waveform, a discrete Fourier transform-spread-orthogonal frequency division multiplexing (DFT-s-OFDM) waveform, an Orthogonal Time Frequency Space (OTFS) waveform, a Frequency Modulated Continuous Wave (FMCW) waveform, a pulse waveform, or the like. This may be determined based on an actual usage requirement, and is not limited in this embodiment of this application.

c. Target Measurement Quantity

The target measurement quantity may include a measurement quantity to be measured and/or fed back by the receive end device.

In some embodiments of this application, if the first signal includes at least one of the sensing signal and the integrated communication and sensing signal, the configuration information may include the target measurement quantity.

In some embodiments of this application, when the configuration information includes the target measurement quantity, and the target measurement quantity includes the measurement quantity to be measured and fed back by the receive end device, content of the measurement quantity to be measured by the receive end device is consistent with content of the measurement quantity to be fed back by the receive end device.

In some embodiments of this application, the target measurement quantity may include at least one of channel-related information or sensing-related information.

In some embodiments of this application, the channel-related information may include at least one of the following: a channel matrix H, Channel State Information (CSI), power of each path in a multipath channel, a delay of each path in the multipath channel, an angle of each path in the multipath channel, Doppler spread, a Doppler frequency shift, a phase difference between a first antenna and a second antenna, or a delay difference between the first antenna and the second antenna.

The first antenna and the second antenna are different antennas in the receive end device for receiving the first signal.

In some embodiments of this application, the sensing-related information may include at least one of the following: characteristic information of a target object, related information of a target event, or related information of a target environment. The target object is an object sensed by detecting the first signal, the target event is an event sensed by detecting the first signal, and the target environment is an environment sensed by detecting the first signal.

In some embodiments of this application, the target object may be any possible object such as a plant, an article, a person, or an animal. A specific target object may be determined based on an actual usage requirement, and is not limited in this embodiment of this application.

It should be noted that the characteristic information of the target object may be understood as information capable of reflecting an attribute of the target object or a status of the target object.

In some embodiments of this application, the characteristic information of the target object may be at least one of the following: a position of the target object, a speed of the target object, an acceleration of the target object, a material of the target object, a shape of the target object, a category of the target object, or a Radar Cross Section (RCS) area of the target object.

It should be noted that the related information of the target event may be understood as information about the target event, that is, information that can be detected/sensed when the target event occurs.

In some embodiments of this application, the target event may be a fall detection event, an intrusion detection event, a quantity statistics event, an indoor positioning event, a gesture recognition event, a lip recognition event, a gait recognition event, an expression recognition event, a respiratory monitoring event, a heart rate monitoring event, or an object recognition event.

In some embodiments of this application, the related information of the target event may include at least one of the following: a fall speed, a fall posture, an intrusion object, an intrusion speed, an intrusion quantity, position information, hand posture information, lip posture change information, a travel speed, travel posture information, lip status information, eye status information, a respiratory rate, a heart rate, a pulse, a blood flow velocity, a shape of the object, a size of the object, a material of the object, a color of the object, or a pattern of the object.

It should be noted that the related information of the target environment may be understood as information about the target environment, that is, information that can be detected/sensed from the target environment, in the target environment.

In some embodiments of this application, the related information of the target environment may be at least one of the following: humidity, brightness, temperature and humidity, atmospheric pressure, air quality, weather conditions, a landform or terrain, building/vegetation distribution, population statistics, crowd density, vehicle density, or the like.

In some embodiments of this application, the target measurement quantity may include at least one of the following: a measurement quantity on each antenna (Per antenna) or antenna port (Per port) that sends the first signal in the transmit end device, a measurement quantity on each antenna or antenna port that receives the first signal in the receive end device, or a measurement quantity on each sensing resource in the first signal, where the sensing resource may be a resource block (RB), a subcarrier, or an RB group.

d. Signal Sequence Information of the First Signal

In some embodiments of this application, the sequence information of the first signal may include at least one of the following: a sequence type of the first signal or a generation manner of the sequence.

In some embodiments of this application, a sequence type of a sequence used by the first signal may be any one of the following: a Zadoff-Chu (ZC) sequence, a Pseudo-Noise (PN) sequence, a Gold sequence (a type of pseudo-random noise sequence), a Kasami sequence, or a Golay complementary sequence.

In some embodiments of this application, the configuration information may further include at least one of the following: a first resource configuration of the first signal, transmit signal power corresponding to the first signal, a Modulation and Coding Scheme (MCS) corresponding to the first signal, an MCS table corresponding to the first signal, or a channel quality indicator (CQI) table corresponding to the first signal, where the first resource configuration may include at least one of a time-frequency resource configuration or a space resource configuration.

In some embodiments of this application, the first resource configuration may include at least one of the following: a time domain position, a frequency domain position, a transmission cycle (for example, the transmission cycle may be P time units, indicating that the sensing signal or the integrated communication and sensing signal is scheduled every P time units, where P may be 0, indicating continuous scheduling), a time domain offset, a predefined transmission pattern, a signal direction, a beam direction, precoding, a beamforming vector, or a quasi-co-location QCL relationship, where the time domain position may include at least one of a time domain start position or duration, the frequency domain position may include at least one of a frequency domain start position or a bandwidth, the transmission mode may include at least one of a time domain transmission pattern, a frequency domain transmission pattern, or a time-frequency domain transmission pattern, and the QCL relationship may include at least one of a QCL signal source or a QCL type.

In some embodiments of this application, the time domain offset may be an offset relative to a current time unit or DCI, or an offset within a transmission cycle.

In some embodiments of this application, the predefined transmission mode may include at least one of a predefined time domain transmission mode, a predefined frequency domain transmission mode, or a predefined time-frequency domain transmission mode.

It may be understood that the transmit end device may send the first signal according to the predefined transmission mode.

In some embodiments of this application, the first resource configuration may include at least one of a signal direction, a beam direction, precoding, or a beamforming vector; or may include related indication information of at least one of a signal direction, a beam direction, precoding, or a beamforming vector.

For example, the related indication information of the signal direction and the beam direction may be an angle of departure of the signal. The angle of departure of the signal may be an azimuth of departure of the signal and/or a pitch angle of departure of the signal.

For another example, the related indication information of precoding and the beamforming vector may send a precoding matrix used by the first signal, to indicate an index of a Precoding Matrix Indicator (PMI) or the beamforming vector.

In some embodiments of this application, when the first signal is a signal to be sent by the transmit end device in a target time unit, the first resource configuration may further include at least one of a quantity of target time units or indexes of the target time units.

In some embodiments of this application, the QCL signal source may be used to represent a QCL relationship met between the sensing signal and/or the integrated communication and sensing signal in the first signal and any other signal (hereinafter referred to as signal 0) than the first signal. Signal 0 may be a communication signal (which may be the communication signal in the first signal or another communication signal), for example, a Synchronization Signal and PBCH block (SSB) signal, an CSI reference signal CSI-RS, a Tracking Reference signal (TRS), a DeModulation Reference Signal (DMRS), a Phase tracking reference signal (PT-RS), a sensing signal other than the sensing signal in the first signal, or an integrated communication and sensing signal other than the integrated communication and sensing signal in the first signal. The SSB includes both a communication signal and a reference signal.

In some embodiments of this application, the QCL type may also be used to represent a QCL relationship met between the sensing signal and/or the integrated communication and sensing signal in the first signal and other signals than the first signal.

In some embodiments of this application, the QCL type may be QCL-typeA, QCL-typeB, QCL-typeC, QCL-typeD, or another QCL type.

In some embodiments of this application, in a case that the first signal is a signal to be sent by the transmit end device in a target time unit, the first resource configuration may further include at least one of a quantity of target time units or indexes of the target time units.

For example, when the first signal is the sensing signal (and/or the integrated communication and sensing signal), the first resource configuration may include at least one of a quantity of time units for transmitting the sensing signal (and/or the integrated communication and sensing signal) and the indexes of the time units.

In some embodiments of this application, transmit signal power corresponding to the first signal may be within a power range.

For example, the transmit signal power corresponding to the first signal may be within a power range from −20 dBm to 23 dBm, and for the transmit signal power corresponding to the first signal, a value is taken every 2 dBm within the power range.

In this embodiment of this application, when the signal type of the signal included in the first signal varies, the configuration information of the first signal may also vary.

In some embodiments of this application, in a case that the first signal includes the sensing signal and/or the integrated communication and sensing signal, the configuration information of the first signal may include at least one of the target measurement quantity or the signal sequence information.

For example, if the first signal is the sensing signal and/or the integrated communication and sensing signal, the transmit end indicates to the receive end device by using the first signaling: a measurement quantity (that is, the target measurement quantity) required or to be measured by the receive end device and related to the first signal. In this way, the receive end device can measure only the measurement quantity indicated in the first signaling without measuring other measurement quantities, thereby reducing complexity.

For another example, if the first signal is the sensing signal and/or the integrated communication and sensing signal, the transmit end indicates the signal sequence information of the first signal to the receive end device by using the first signaling. In this case, the receive end device serves as a sensing receive end in a dual-station or multi-station mode, that is, the receive end device needs to receive the first signal, and analyze and process the sensing signal in the first signal to obtain a sensing parameter.

In some embodiments of this application, in a case that the first signal includes the communication signal and/or the integrated communication and sensing signal, the configuration information of the first signal may include the MCS, the MCS table, and the CQI table.

It may be understood that if the first signal is the integrated communication and sensing signal, the transmit end device may indicate the MCS, the MCS table, and the CQI table of the first signal to the receive end device by using the first signaling.

In some embodiments of this application, after the receive end device receives the first signaling, if the receive end device needs to receive the first signal sent by the transmit end device in the target time unit, the receive end device may receive the first signal, and process the first signal according to the indication of the first signaling. If the receive end device does not need to receive the first signal sent by the transmit end device in the target time unit, the transmit end device may receive an echo signal of the first signal, and process the echo signal according to the configuration information of the first signal. It may be understood that in this case, the receive end device does not receive the first signal, and therefore does not process the first signal.

It should be noted that the case that the receive end device does not need to receive the first signal sent by the transmit end device in the target time unit includes:

1. If the first signal is the communication signal, and the receive end device is a sensing receive end, the receive end device does not need to receive the first signal, that is, the sensing receive end receives only the sensing signal sent from the transmit end device.

2. If the first signal is the sensing signal, and the receive end device is a non-sensing signal receive end, for example, if the transmit end device is in a single-station sensing mode, or the transmit end device is in a dual-station or multi-station sensing mode, but the receive end device does not have a function of receiving the sensing signal (therefore, the receive end device needs to receive only the communication signal sent by the transmit end device).

In this embodiment of this application, if the signal type of the first signal vanes, the mode in which the receive end device processes the first signal may also vary.

It should be noted that a basic condition for the receive end device to process the first signal is: the receive end device knows the signal type of the first signal, that is, the configuration information includes at least the first information, to notify/indicate the signal type of the first signal to the receive end device by using the first information. Therefore, the receive end device can determine, based on the signal type of the first signal, a manner of processing the first signal.

Further, if the configuration information further includes other information (for ease of description, hereinafter referred to as target information) than the first information, for example, at least one of the signal waveform, the target measurement quantity, the signal sequence information, the first resource configuration, the transmit signal power, the MCS, the MCS table, or the CQI table, the receive end device can quickly process the first signal according to the target information.

In some embodiments of this application, in a case that the configuration information includes the first information, the receive end device may process the first signal in any one of the following manners 1, 2, or 3.

Manner 1: In a case that the configuration information indicates that the first signal is the sensing signal, the receive end device does not restore the communication information in the first signal, and detects the sensing signal in the first signal according to the configuration information.

Manner 2: In a case that the configuration information indicates that the first signal includes the integrated communication and sensing signal, the receive end device may restore the communication information in the first signal, and/or detect the sensing signal in the first signal according to the configuration information.

Manner 3: In a case that the configuration information indicates that the first signal includes the communication signal, the receive end device restores the communication information in the first signal.

It may be understood that after detecting the sensing signal in the first signal according to the configuration information, the receive end device may obtain feedback information associated with the target measurement quantity, where the feedback information may also become a sensing parameter (value).

In some embodiments of this application, the first signaling may be any one of the following: higher layer signaling, media access control-control element MAC CE signaling, or layer 1 signaling.

It should be noted that, in actual implementation, the first signaling may also be transmitted through a data transmission channel. For example, the transmit end device may transmit the first signaling through a physical downlink shared channel (PDSCH).

In some embodiments of this application, the layer 1 signaling may be any one of the following: System Information Block (SIB) signaling, Master Information Block (MIB) signaling, or Downlink Control Information (DCI) signaling.

In some embodiments of this application, in a case that the first signaling is the layer 1 signaling, if the layer 1 signaling is the DCI signaling, the configuration information of the first signal may be indicated by any one of the following: a specific field in the DCI signaling, a specific field added to the DCI signaling, different modes for scrambling the DCI signaling, or a specific DCI format.

It may be understood that the indication of the configuration information by using the specific field in the DCI signaling and the specific field added to the DCI signaling can become reuse of an original DCI format.

It may be understood that when the configuration information is indicated by different modes for scrambling the DCI signaling, different scrambling modes are associated with different information in the configuration information.

It may be understood that when the configuration information is indicated by the specific DCI format, the specific DCI format is associated with the configuration information (for example, the signal type). For example, lengths and/or indication fields of the specific DCI format and the original DCI format are different.

The following uses examples to separately describe a manner of indicating each piece of information in the configuration information.

(1) The signal type may be indicated in at least one of the following manners: higher layer signaling, a specific field in the DCI signaling, a specific field added to the DCI signaling, different modes for scrambling the DCI signaling, or a specific DCI format, that is, the DCI format is associated with the signal type.

(a) A specific field in original DCI signaling, for example, DCI 1_x signaling, is used to indicate the signal type.

(b) An X-bit field is added to the original DCI signaling such as DCI 1_x signaling to indicate the signal type. (c) The DCI signaling is scrambled in different modes to indicate the signal type. For example, the DCI signaling is scrambled by using a specific radio network temporary identifier (RNTI), where the specific RNTI is associated with the signal type. (d) A specific DCI format is used to indicate the signal type, where the specific DCI format is associated with the signal type (for example, the sensing signal or the integrated communication and sensing signal), and a specific manner may be: lengths and/or indication fields of the specific DCI format and the original DCI format are different.

(2) The signal waveform may be indicated in at least one of the following manners: higher layer signaling, a specific field in the DCI signaling, a specific field added to the DCI signaling, different modes for scrambling the DCI signaling, or a specific DCI format, that is, the DCI format is associated with the signal waveform.

(3) For the MCS, the MCS may be indicated by a specific field in the DCI signaling.

(4) The MCS table and the CQI table may be indicated in at least one of the following manners: higher layer signaling, a specific field in the DCI signaling, a field added to the DCI signaling, different manners for scrambling the DCI signaling, or a specific DCI format.

It should be noted that when the specific DCI format is used to indicate the MCS table and/or the CQI table, after the receive end device receives the DCI signaling in the specific format associated with the signal type/waveform, parties sending and receiving (that is, the receive end device and the transmit end device) the first signal (for example, the first signal includes the integrated communication and sensing signal) use a pre-agreed MCS table or CQI table dedicated to the integrated communication and sensing signal by default.

(5) First configuration information may be indicated in at least one of the following manners: a specific field in DCI or a specific field added to the DCI.

In some embodiments of this application, the first signaling may include M pieces of signaling, the configuration information of the first signal may be indicated by at least one of the M pieces of signaling, and M is a positive integer. In other words, it may be understood that configuration information of a signal (for example, the first signal) transmitted from the transmit end device to the receive end device may be indicated by one piece of signaling or a plurality of pieces of signaling.

In some embodiments of this application, assuming that the configuration information of the first signal includes at least two pieces of second information, and that each piece of second information may be any one of the following: the first information, the signal waveform of the first signal, or the signal sequence information of the first signal, in a case that an association relationship, for example, a one-to-one correspondence, exists between the at least two pieces of second information, the first signaling may be used to indicate at least one of the at least two pieces of second information, or the first signaling may be used to indicate index information related to the at least two pieces of second information. In some embodiments, each of the at least two pieces of second information may be indicated separately. This may be determined based on an actual usage requirement, and is not limited in this embodiment of this application.

In the signal transmission method provided in this embodiment of this application, because the transmit end device can send the first signaling indicating the configuration information of the first signal to the receive end device, after the receive end device receives the first signaling, the receive end device can perform differentiated processing on the first signal according to the indication of the first signaling, thereby improving efficiency of signal processing of the receive end device and reducing complexity of processing.

In some embodiments of this application, the first signaling may be further used to indicate related information of a feedback channel, and the related information of the feedback channel may include at least one of the following: a transmission format of the feedback channel, a time domain resource of the feedback channel, or a frequency domain resource of the feedback channel, where the feedback channel is a channel used when the receive end device sends feedback information, and the feedback information is associated with the target measurement quantity.

It should be noted that, that the feedback information is associated with the target measurement quantity may be understood as "information obtained after the receive end device measures the target measurement quantity, that is, the feedback information, is a result obtained by the receive end device by measuring the target measurement quantity".

For example, the feedback information may include a size, a color, a material, or the like detected by the receive end device based on the first signal.

In some embodiments of this application, after the foregoing step 101, the signal transmission method provided in this embodiment of this application may further include the following step 403 and step 404.

Step 403: The receive end device sends the feedback information to the transmit end device.

Step 404: The transmit end device receives the feedback information sent by the receive end device.

The feedback information is associated with the target measurement quantity.

In some embodiments of this application, the receive end device may perform the foregoing step 403 in a case that the configuration information includes the target measurement quantity and that the target measurement quantity includes the measurement quantity to be fed back by the receive end device. In some embodiments, the receive end device may perform the foregoing step 403 in a case that the receive end device and the transmit end device agree in advance that the feedback information needs to be fed back. This may be determined based on an actual usage requirement, and is not limited in this embodiment of this application.

In this embodiment of this application, because the receive end device can send the feedback information associated with the target measurement quantity to the transmit end device, after receiving the feedback information, the transmit end can know, based on the feedback information, an object, event, or environment sensed by detecting the first signal.

In some embodiments of this application, assuming that the configuration information of the first signal does not include the first resource configuration, so that overheads can be reduced, after the foregoing step 402, the signal transmission method provided in this embodiment of this application may further include the following step 405.

Step 405: The receive end device does not receive the first signal, or receives the first signal according to a default format.

In some embodiments of this application, the transmit end device may semi-persistently schedule the first signal by using the first signaling, or the transmit end device may dynamically schedule the first signal by using the first signaling. This may be determined based on an actual usage requirement, and is not limited in this embodiment of this application.

It may be understood that in this embodiment of this application, if the transmit end device semi-persistently schedules the first signal, the transmit end device may send the semi-persistently scheduled first signal to the receive end device; or if the transmit end device dynamically schedules the first signal, the transmit end device may send the dynamically scheduled first signal to the receive end device.

In some embodiments of this application, assuming that the first signal is a signal to be sent by the transmit end device in the target time unit, the transmit end device may dynamically schedule and/or semi-persistently schedule the first signal in at least one time unit in the target time unit.

In some embodiments of this application, in a process in which the transmit end device semi-persistently schedules the first signal by using the first signaling, if the transmit end device needs to dynamically schedule a second signal by using second signaling, and a first resource collides with a second resource, the signal transmission method provided in this embodiment of this application may further include the following steps 406 and 407, or may include the following steps 408 and 409.

Step 406: The transmit end device sends the second signaling to the receive end device, and cancels sending the semi-persistently scheduled first signal to the receive end device.

Step 407: The receive end device receives the second signaling sent by the transmit end device, and receives and processes the second signal according to an indication of the second signaling.

The second signal may include at least one type of signal, the first resource may be a sending resource corresponding to the semi-persistently scheduled first signal, and the second resource is a sending resource corresponding to the dynamically scheduled second signal.

In this embodiment of this application, in a process in which the transmit end device semi-persistently schedules the first signal, the second signaling is sent by the transmit end device in a case that the transmit end needs to dynamically schedule the second signal by using the second signaling and that the first resource collides with the second resource, and the second signaling is used to indicate/notify that the transmit end device needs to dynamically schedule the second signal.

In some embodiments of this application, the sending resource corresponding to the signal may include at least one of the following: a time domain resource, a frequency domain resource, a time-frequency domain resource, or a space resource. The space resource may be a beam direction.

It should be noted that in this embodiment of this application, a collision between sending resources corresponding to two signals may be understood as at least a partial overlap between time domain resources, frequency domain resources, or time-frequency domain resources required for sending the two signals.

It should be noted that, that the receive end device receives and processes the second signal according to the indication of the second signaling may be understood as "the receive end device receives and processes the dynamically scheduled second signal according to configuration information of the second signal indicated by the second signaling". For the detailed description of the configuration information of the second information, refer to the related description of the configuration information of the first signal in the foregoing embodiment. To avoid repetition, details are not described herein again.

It can be learned that in step 406 and step 407, the transmit end device cancels the semi-persistent scheduling of the first signal and dynamically schedules the second signal, to avoid a collision between the sending resource corresponding to the semi-persistently scheduled signal and the sending resource corresponding to the dynamically scheduled signal.

Step 408. The transmit end device does not send the second signaling to the receive end device, and continues to send the semi-persistently scheduled first signal to the receive end device.

Step 409: The receive end device receives the first signal semi-persistently scheduled and sent by the transmit end device.

It can be learned that in step 408 and step 409, the transmit end device abandons the dynamical scheduling of the second signal and continues to semi-persistently schedule the first signal, to avoid the collision between the sending resource corresponding to the semi-persistently scheduled signal and the sending resource corresponding to the dynamically scheduled signal.

In some embodiments of this application, the foregoing step 406 or step 408 may be performed after the foregoing step 401.

In this embodiment of this application, when the sending resource corresponding to the semi-persistently scheduled signal collides with the sending resource corresponding to the dynamically scheduled signal, on one hand, the transmit end device can cancel the semi-persistent scheduling of the first signal, and dynamically schedule the second signal, on the other hand, the transmit end device can abandon the dynamic scheduling of the second signal and continue to semi-persistently schedule the first signal, to avoid the collision between the sending resource corresponding to the semi-persistently scheduled first signal and the sending resource corresponding to the dynamically scheduled second signal.

In some embodiments of this application, a first time point and a second time point meet a first preset time interval, and the first time point is earlier than the second time point, where the first time point is a time point at which the transmit end device sends the second signaling, and the second time point is a time point at which the transmit end device sends the semi-persistently scheduled first signal next time.

In some embodiments of this application, "receiving and processing the second signal according to an indication of the second signaling" in the foregoing step 407 may be implemented by the following step 407a.

Step 407a: In a case that a third time point and a fourth time point meet a second preset time interval and that the third time point is earlier than the fourth time point, the receive end device receives and processes the second signal according to the indication of the second signaling, where the third time point is a time point at which the receive end device receives the second signaling, and the fourth time point is a time point at which the receive end device receives the semi-persistently scheduled first signal next time.

In some embodiments of this application, the second preset time interval may be the same as or different from the first preset time interval.

In this embodiment of this application, the receive end device receives and processes the second signal according to the indication of the second signaling only in the case that the third time point and the fourth time point meet the second preset time interval and that the third time point is earlier than the fourth time point. Therefore, it can be ensured that the receive end device can accurately receive and process the signal.

In some embodiments of this application, "receiving and processing the second signal according to an indication of the second signaling" in the foregoing step 407 may be replaced with the following step 407*b*.

Step 407*b*: In a case that the third time point and the fourth time point do not meet the second preset time interval, the receive end device does not receive and process the second signal according to the indication of the second signaling, and feeds back error information to the transmit end device.

For related descriptions in step 407*b*, refer to related descriptions in the foregoing embodiment. To avoid repetition, details are not described herein again.

In this embodiment of this application, the receive end device does not receive and process the second signal according to the indication of the second signaling in the case that the third time point and the fourth time point do not meet the second preset time interval. Therefore, the receive end device can accurately receive and process the signal.

In some embodiments of this application, if the transmit end device needs to semi-persistently schedule third signals, and sending resources corresponding to different types of signals among the third signals collide, after the foregoing step 402, the signal transmission method provided in this embodiment of this application may further include the following steps 410 and 411.

Step 410: The transmit end device sends third signaling to the receive end device, and sends a fourth signal to the receive end device according to the third signaling.

Step 411: The receive end device receives the third signaling sent by the transmit end device, and receives and processes the fourth signal according to an indication of the third signaling.

The third signals include at least two types of signals, and the fourth signal is one type of signal among the third signals. The third signaling is sent by the transmit end device in a case that the transmit end device needs to semi-persistently schedule the third signals and that the sending resources corresponding to different types of signals among the third signals collide, and the third signaling is used to indicate that the transmit end device needs to semi-persistently schedule the fourth signal.

It should be noted that, that the receive end device receives and processes the fourth signal according to the indication of the third signaling may be understood as "the receive end device receives and processes the semi-persistently scheduled fourth signal according to configuration information of the fourth signal indicated by the third signaling". For the description of the configuration information of the fourth signal, refer to the related description of the configuration information of the first signal in the foregoing embodiment. To avoid repetition, details are not described herein again.

In some embodiments of this application, the transmit end device may be any one of the following: a base station, UE, or a sensing server; and the receive end device may be a base station or UE.

The following uses specific examples (the following examples 1 to 3) to describe the signal transmission method provided in this embodiment of this application.

Example 1

Figure 5:
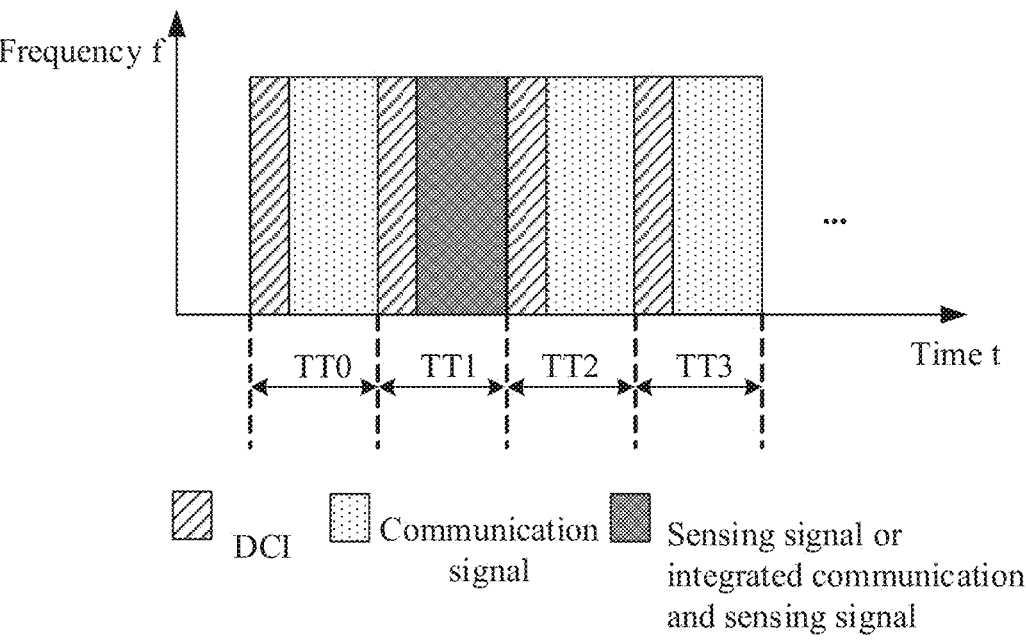
FIG. 5 is a first schematic diagram of signal transmission of a signal transmission method according to an embodiment of this application.
Figure 6:
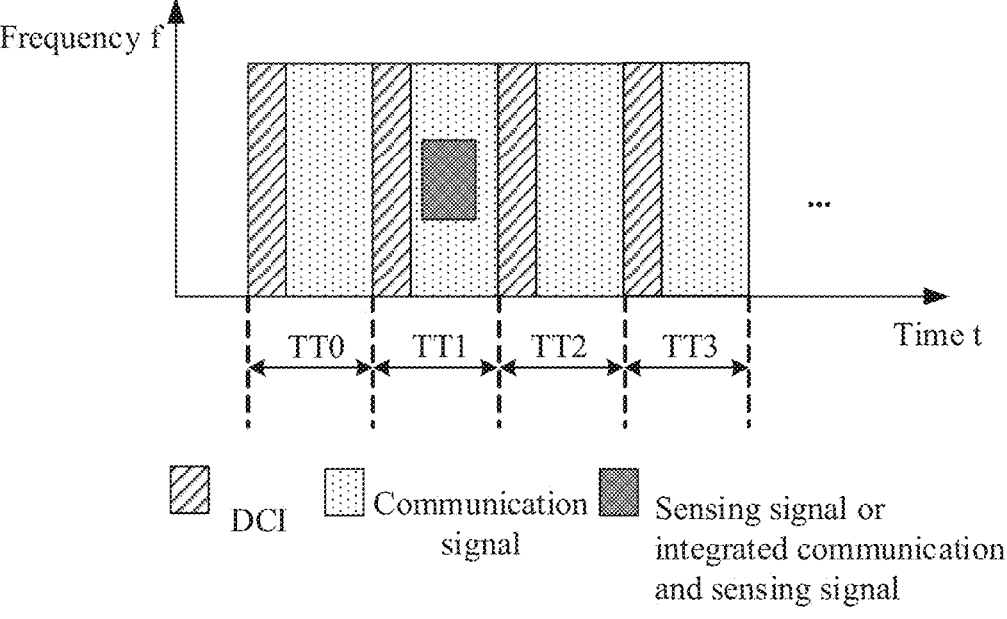
FIG. 6 is a second schematic diagram of signal transmission of a signal transmission method according to an embodiment of this application.

In this example, the transmit end device may dynamically schedule a signal (such as the first signal in this embodiment of this application) to be sent in each time unit, and the time unit may be at least one of a TTI, a slot, or a sub-slot. As shown in FIG. 5, the transmit end device may send only one type of signal in each time unit, or as shown in FIG. 6, the transmit end device may send a plurality of types of signals in each time unit.

In this example, the transmit end device may send a piece of signaling to the receive end device in each time unit, and the signaling is used to indicate to the receive end device: configuration information of a specific type of signal sent by the transmit end device in the current time unit; and the configuration information may include at least one of the following: first information, a signal waveform, a target measurement quantity, signal sequence information, a first resource configuration, transmit signal power, a modulation and coding scheme MCS, an MCS table, or a channel quality indicator CQI table. Then after receiving the signaling, the receive end device may receive and process, according to the indication of the signaling, the signal sent by the transmit end device in the current time unit.

In one manner, DCI signaling is used to indicate to the receive end device that the signal sent by the transmit end device in the current time unit is at least one of the communication signal, the sensing signal, or the integrated communication and sensing signal. A specific indication method may be at least one of the following:

(1) A specific field in original DCI signaling, for example, DCI 1_x signaling, is used to indicate the signal type.

(2) An X-bit field is added to the original DCI signaling such as DCI 1_x signaling to indicate the signal type.

(3) The DCI signaling is scrambled in different modes to indicate the signal type. For example, the DCI signaling is scrambled by using a specific radio network temporary identifier (RNTI), where the specific RNTI is associated with the signal type.

(4) A specific DCI format is used to indicate the signal type, where the specific DCI format is associated with the signal type (such as the sensing signal or the integrated communication and sensing signal), and a specific manner may be: lengths and/or indication fields of the specific DCI format and the original DCI format are different.

In another manner, the transmit end device indicates to the receive end device by using DCI signaling: a time-frequency resource configuration and/or a space resource configuration of the specific type of signal sent by the transmit end device in the current time unit. A specific indication method may be as follows:

(1) If an original DCI format such as the DCI format of DCI 1_x signaling is reused, the indication method may be any one of the following:

(A) In a case that one type of signal is transmitted per time unit, a specific field in the original DCI signaling is used. For example, a field indicating a time-frequency resource or space resource configuration of the communication signal or a reserved field of DCI is used to indicate to the receive end device: a time-frequency resource configuration and/or a space resource configuration of the sensing signal or the integrated communication and sensing signal sent by the transmit end in the current time unit; and the time-frequency resource configuration and/or space resource configuration include/includes at least one of the following:

(a) a time domain position, including at least one of a time domain start position or duration;

(b) a frequency domain position, including at least one of a frequency domain start position or a bandwidth;

(c) at least one of a predefined transmission time pattern, frequency pattern, or time-frequency pattern;

(d) a signal direction, a beam direction, precoding, a beamforming vector, or related indication information; and (e) a QCL relationship, including at least one of the following: a QCL signal source, that is, a QCL relationship met between the sensing signal or the integrated communication and sensing signal transmitted by the transmit end device and the communication signal (for example, an SSB, a TRS, or a DMRS) or another sensing signal and integrated communication and sensing signal or the like; and a QCL type, for example, QCL-typeA, QCL-typeB, QCL-typeC, QCL-typeD, or another QCL type.

(B) In a case that the transmit end device transmits different types of signals in each time unit, a specific field in the original DCI may be used to indicate the time-frequency resource configuration and/or space resource configuration of the sensing signal and/or the integrated communication and sensing signal sent by the transmit end in the current time unit, and the specific field may be a reserved field, or a field indicating configuration information of an original communication signal (that is, new interpretation of the original field when it is determined that the DCI signaling is used to schedule the sensing signal or the integrated communication and sensing signal). For the description of the time-frequency resource configuration or space resource configuration, refer to the foregoing embodiment.

(C) In a case that different types of signals are transmitted in each time unit, an X-bit field is added to the original DCI to indicate to the receive end the time-frequency resource configuration or space resource configuration of the sensing signal or the integrated communication and sensing signal sent in the current time unit. For the description of the time-frequency resource configuration or space resource configuration, refer to the foregoing embodiment.

(2) If DCI in a specific format is used, a specific field in the DCI in the specific format is used to indicate to the receive end the time-frequency resource configuration or space resource configuration of the sensing signal or the integrated communication and sensing signal sent in the current time unit. For the description of the time-frequency resource configuration or space resource configuration, refer to the foregoing embodiment.

Further, the transmit end may not indicate the time-frequency resource configuration or space resource configuration of the receive end in the DCI to reduce overheads. In this case, the receive end does not receive the sensing signal or the integrated communication and sensing signal in the time unit, or receives the sensing signal or the integrated communication and sensing signal in the time unit according to a default format.

In still another manner, the transmit end device indicates to the receive end device by using DCI signaling: the signal waveform and sequence information of the specific type of signal sent by the transmit end device in the current time unit. A specific indication method may be at least one of the following:

(1) If an original DCI format such as the DCI format of DCI 1_x signaling is reused, the indication method may be as follows:

(A) A specific field in the original DCI signaling is used to indicate to the receive end the signal waveform and sequence information of the sensing signal or the integrated communication and sensing signal sent, where the specific field may be a reserved field or may be a field indicating configuration information of an original communication signal (that is, new interpretation of the original field when it is determined that the DCI signaling is used to schedule the sensing signal or the integrated communication and sensing signal).

(B) The DCI signaling is scrambled in different modes to indicate the signal type, for example, scrambled by using a specific RNTI, where the RNTI is associated with the signal waveform or sequence information.

(C) An X-bit (X is a positive integer) field is added to the original DCI signaling to indicate to the receive end device: the signal waveform and sequence information of the specific type of the signal sent by the transmit end device.

(a) If DCI in a specific format is used, the signal waveform and sequence information of the specific type of signal sent are indicated to the receive end by using a specific field in the DCI in the specific format.

Further, if at least two of the signal type, signal waveform, and sequence information have an association relationship, such as a one-to-one correspondence, the at least two can be jointly indicated. For example, the transmit end device may indicate at least one of an index number (an index number of an index corresponding to the at least two), the signal type, the signal waveform, and the sequence information by using DCI signaling, as shown in Table 1.

TABLE 1

| Index number | Signal type | Signal waveform | Sequence |
|---|---|---|---|
| Index 1 | Communication signal | Waveform 1 | — |
| Index 2 | Sensing signal | Waveform 2 | Sequence 1 |
| Index 3 | Integrated communication and sensing signal | Waveform 3 | Sequence 2 |

Example 2

Figure 7:
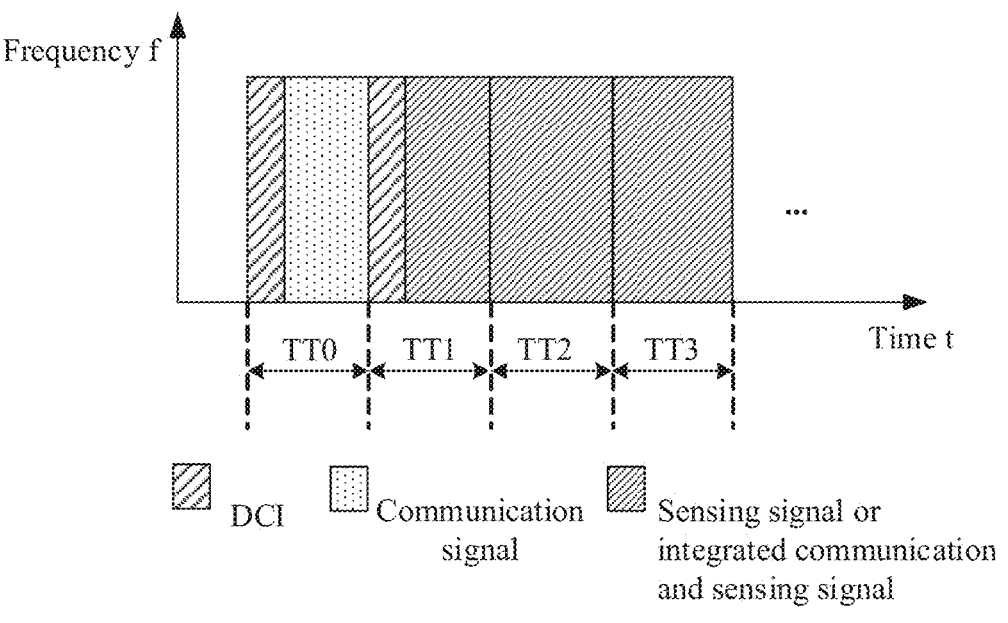
FIG. 7 is a third schematic diagram of signal transmission of a signal transmission method according to an embodiment of this application.
Figure 8:
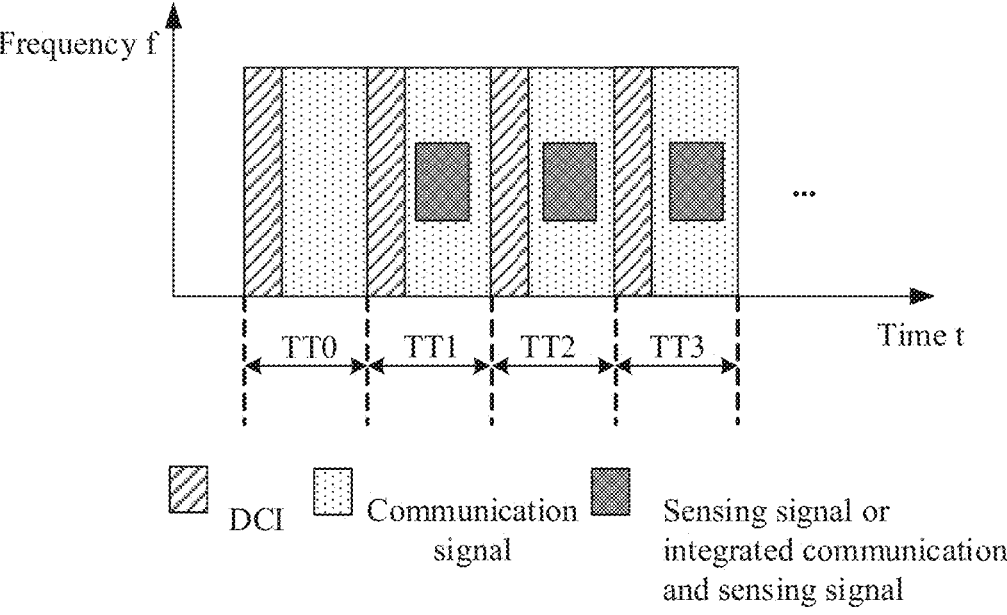
FIG. 8 is a fourth schematic diagram of signal transmission of a signal transmission method according to an embodiment of this application.

In this example, the transmit end device may dynamically schedule a signal (such as the foregoing first signal) to be sent in a plurality of time units, and the time unit may be at least one of a TTI, a slot, or a sub-slot. As shown in FIG. 7, the transmit end device may send only one type of signal in each time unit, or as shown in FIG. 8, the transmit end device may send a plurality of types of signals in each time unit.

In this example, the transmit end device may send a piece of signaling to the receive end device in the plurality of time units (the signaling may be sent in the first time unit among the plurality of time units to the receive end device), and the signaling is used to indicate to the receive end device: configuration information of a specific type of signal to be sent by the transmit end device in the plurality of time units; and the configuration information may include at least one of the following: first information, a signal waveform, a target measurement quantity, signal sequence information, a first resource configuration, transmit signal power, a modulation and coding scheme MCS, an MCS table, or a channel quality indicator CQI table. Then after receiving the signaling, the receive end device may receive and process, according to the indication of the signaling, the signal sent by the transmit end device in the plurality of time units.

In one manner, the transmit end indicates to the receive end by using DCI signaling: a time-frequency resource configuration or a space resource configuration of the sensing signal and/or the integrated communication and sensing signal sent by the transmit end device in the plurality of time units, where the plurality of time units may be continuous or discontinuous. A specific indication method by using the DCI signaling may be as follows:

(1) If an original DCI format such as DCI 1_x is reused, the indication method may be as follows:

(A) In a case that the transmit end device transmits (that is, sends) a type of signal in each of the plurality of time units, a specific field in original DCI may be used. For example, a field indicating a time-frequency resource configuration or a space resource configuration of the communication signal or a reserved field is used, and/or an X-bit field is added to indicate to the receive end the time-frequency resource configuration or space resource configuration of the sensing signal or the integrated communication and sensing signal sent in the plurality of time units, and the time-frequency resource configuration or space resource configuration includes at least one of the following:

(a) a time domain position, including at least one of a time domain start position or duration;

(b) a frequency domain position, including at least one of a frequency domain start position or a bandwidth;

(c) at least one of a predefined transmission time pattern, frequency pattern, or time-frequency pattern;

(d) an offset relative to the current time unit or DCI, that is, a time point for scheduling a time unit for the first time for transmitting the sensing signal or the integrated communication and sensing signal, relative to the current time unit or DCI;

(e) a quantity of time units used for transmitting the sensing signal or the integrated communication and sensing signal, and an index;

(f) a transmission cycle, for example, X time units, indicating that the sensing signal or the integrated communication and sensing signal is scheduled every X time units, where X may be 0, indicating continuous scheduling;

(g) a signal direction, a beam direction, precoding, a beamforming vector, or related indication information; and (h) a QCL relationship, including at least one of the following: a QCL signal source, that is, a QCL relationship met between the transmitted sensing signal or integrated communication and sensing signal and the communication signal, for example, an SSB, a TRS, or a DMRS, or another sensing signal or integrated communication and sensing signal, or the like; and a QCL type, for example, QCL-typeA, QCL-typeB, QCL-typeC, QCL-typeD, or another QCL type.

(B) In a case that the transmit end device transmits different types of signals in each of the plurality of time units, a specific field in the original DCI signaling, for example, a reserved field, may be used, and/or an X-bit field is added to the original DCI signaling to indicate to the receive end: the time-frequency resource configuration or space resource configuration of the sensing signal or the integrated communication and sensing signal sent by the transmit end device in the current time unit. For descriptions of the time-frequency resource configuration or space resource configuration, refer to the foregoing embodiment.

(2) If DCI signaling in a specific format is used, a specific field in the DCI signaling in the specific format is used to indicate to the receive end: the time-frequency resource configuration or space resource configuration of the sensing signal or the integrated communication and sensing signal sent by the transmit end device in the current time unit. For the description of the time-frequency resource configuration or space resource configuration, refer to the foregoing embodiment.

Example 3

The sensing signal or integrated communication and sensing signal transmitted in a plurality of time units (the time unit may be a TTI, a slot, a sub-slot, or the like) is semi-persistently scheduled, and only one type of signal is transmitted in each time unit, or different types of signals are transmitted in each time unit.

In this example, the transmit end device may semi-persistently schedule the signal (at least one of the sensing signal, the integrated communication and sensing signal, and the communication signal) sent in the plurality of time units, where the time unit may be at least one of a TTI, a slot, or a sub-slot. The transmit end device may send only one type of signal in each of the plurality of time units, or the transmit end device may send a plurality of types of signals in each of the plurality of time units.

In this example, the transmit end device may send, to the receive end device, signaling corresponding to the plurality of time units, and the signaling is used to indicate to the receive end device: configuration information of a specific type of signal sent by the transmit end device in the plurality of time units; and the configuration information may include at least one of the following: first information, a signal waveform, a target measurement quantity, signal sequence information, a first resource configuration, transmit signal power, a modulation and coding scheme MCS, an MCS table, or a channel quality indicator CQI table. Then after receiving the signaling, the receive end device may receive and process, according to the indication of the signaling, the signal sent by the transmit end device in the current time unit.

In one manner, the transmit end may indicate to the receive end by using RRC signaling: semi-persistently scheduled configuration information (that is, the configuration information in this embodiment of this application) of the sensing signal or the integrated communication and sensing signal sent by the transmit end device, where the semi-persistently scheduled configuration information includes at least one of the following:

a signal type;

a signal waveform;

a signal sequence;

a time-frequency resource configuration or a space resource configuration;

a transmission cycle, where for example, the transmission cycle may be P time units, indicating that the sensing signal or the integrated communication and sensing signal is scheduled every P time units, where P may be 0, indicating continuous scheduling;

a time domain offset;

a signal direction, a beam direction, precoding, a beamforming vector, or related indication information;

a QCL relationship;

an MCS, an MCS table, and a CQI table of the integrated communication and sensing signal; or transmit signal power, for example, a value taken every 2 dBm from −20 dBm to 23 dBm.

The time-frequency resource configuration or the space resource configuration includes at least one of the following:

a time domain position, including at least one of a time domain start position or duration;

a frequency domain position, including at least one of a frequency domain start position or a bandwidth; or at least one of a predefined transmission time pattern, frequency pattern, or time-frequency pattern.

The QCL relationship includes at least one of the following: a QCL signal source, that is, a QCL relationship met between the transmitted sensing signal or integrated communication and sensing signal and the communication signal, for example, an SSB, a TRS, or a DMRS, or another sensing signal or integrated communication and sensing signal, or the like; and a QCL type, for example, QCL-typeA, QCL-typeB, QCL-typeC, QCL-typeD, or another QCL type.

The time domain offset may be an offset within a transmission cycle. For example, the time domain offset may be X time units, that is, a time point for scheduling the sensing signal or the integrated communication and sensing signal, relative to a first time unit within each transmission cycle.

In another manner, the transmit end device may indicate to the receive end by using activation DCI signaling: a start time for semi-persistently scheduling the sensing signal or the integrated communication and sensing signal by the transmit end device. It should be noted that the transmit end device may indicate to the receive end device by using activation DCI signaling: at least one of semi-persistently scheduled configuration information of the sensing signal or the integrated communication and sensing signal sent by the transmit end device.

It should be noted that the signal transmission method provided in this embodiment of this application may be performed by the transmit end device or the receive end device, or a signal transmission apparatus, or a control module for performing the signal transmission method in the signal transmission apparatus. In this embodiment of this application, interaction between the transmit end device and the receive end device is used as an example to describe the signal transmission method provided in this embodiment of this application.

Figure 9:
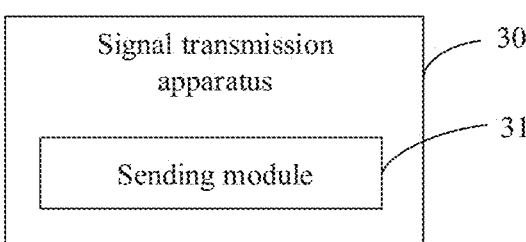
FIG. 9 is a first schematic diagram of a structure of a signal transmission apparatus according to an embodiment of this application.

FIG. 9 is a schematic diagram of a possible structure of a signal transmission apparatus according to an embodiment of this application. As shown in FIG. 9, the signal transmission apparatus 30 may include a sending module 31.

The sending module 31 is configured to send first signaling to a receive end device, where the first signaling is used to indicate configuration information of a first signal; and the configuration information includes at least one of the following: first information, a signal waveform, a target measurement quantity, and signal sequence information, where the first information is used to indicate a signal type of the first signal, or indicate whether the receive end device detects communication information of the first signal; and the target measurement quantity includes a measurement quantity to be measured and/or fed back by the receive end device.

In a possible implementation, the configuration information further includes at least one of the following: a first resource configuration, transmit signal power, a modulation and coding scheme MCS, an MCS table, and a CQI table, where the first resource configuration includes at least one of a time-frequency resource configuration and a space resource configuration.

In a possible implementation, the first signal includes at least one of the following types of signals: a sensing signal, a communication signal, and an integrated communication and sensing signal.

In a possible implementation, the target measurement quantity includes at least one of channel-related information and sensing-related information:

the channel-related information includes at least one of the following: a channel matrix H, channel state information CSI, power of each path in a multipath channel, a delay of each path, an angle of each path, Doppler spread, a Doppler frequency shift, a phase difference between a first antenna and a second antenna, and a delay difference between the first antenna and the second antenna; and the sensing-related information includes at least one of the following: characteristic information of a target object, related information of a target event, and related information of a target environment, where the first antenna and the second antenna are different antennas in the receive end device for receiving the first signal, the target object is an object sensed by detecting the first signal, the target event is an event sensed by detecting the first signal, and the target environment is an environment sensed by detecting the first signal.

In a possible implementation, the target measurement quantity includes at least one of the following: a measurement quantity on each antenna or antenna port that sends the first signal in a transmit end device, a measurement quantity on each antenna or antenna port that receives the first signal in the receive end device, and a measurement quantity on each sensing resource in the first signal, where the sensing resource is an RB, a subcarrier, or an RB group.

In a possible implementation, the first signaling is further used to indicate related information of a feedback channel, and the related information of the feedback channel includes at least one of the following: a transmission format of the feedback channel, a time domain resource of the feedback channel, and a frequency domain resource of the feedback channel, where the feedback channel is a channel used when the receive end device sends feedback information, and the feedback information is associated with the target measurement quantity.

In a possible implementation, the first resource configuration includes at least one of the following: a time domain position, a frequency domain position, a transmission cycle, a time domain offset, a predefined transmission mode, a signal direction, a beam direction, precoding, a beamforming vector, and a QCL relationship, where the time domain position includes at least one of a time domain start position and duration, the frequency domain position includes at least one of a frequency domain start position and a bandwidth, the transmission mode includes at least one of a time domain transmission pattern, a frequency domain transmission pattern, and a time-frequency domain transmission pattern, and the QCL relationship includes at least one of a QCL signal source and a QCL type.

In a possible implementation, the signal transmission apparatus 30 provided in this embodiment of this application further includes a receiving module. After the sending module sends the first signaling to the receive end device, the receiving module is configured to receive feedback information sent by the receive end device, where the feedback information is associated with the target measurement quantity.

In a possible implementation, in a case that the first signal includes the sensing signal and/or the integrated communication and sensing signal, the configuration information includes at least one of the following: the target measurement quantity and at least one of the signal sequence information.

In a possible implementation, in a case that the first signal includes a communication signal and/or an integrated communication and sensing signal, the configuration information includes an MCS, an MCS table, and a CQI table.

In a possible implementation, the first signaling is any one of the following: higher layer signaling, MAC CE signaling, and layer 1 signaling.

In a possible implementation, if the layer 1 signaling is downlink control information DCI signaling, the configuration information is indicated by any one of the following: a specific field reused in the DCI signaling, a specific field added to the DCI signaling, different modes for scrambling the DCI signaling, and a specific DCI format.

In a possible implementation, the first signaling includes M pieces of signaling, the configuration information is indicated by at least one of the M pieces of signaling, and M is a positive integer.

In a possible implementation, the configuration information includes at least two pieces of second information, and each piece of second information is any one of the following: the first information, the signal waveform, and the signal sequence information; and in a case that an association relationship exists between the at least two pieces of second information, the first signaling is used to indicate at least one of the at least two pieces of second information or indicate index information related to the at least two pieces of second information.

In a possible implementation, the sending module is further configured to: in a process in which the transmit end device semi-persistently schedules the first signal, if the transmit end device needs to dynamically schedule a second signal by using second signaling, and a first resource collides with a second resource, send the second signaling to the receive end device, and
      cancel sending the semi-persistently scheduled first signal to the receive end device; or
    skip sending the second signaling to the receive end device, and continue to send the semi-persistently scheduled first signal to the receive end device, where
    the second signal includes at least one type of signal, the first resource is a sending resource corresponding to the semi-persistently scheduled first signal, and the second resource is a sending resource corresponding to the dynamically scheduled second signal.

In a possible implementation, a first time point and a second time point meet a first preset time interval, and the first time point is earlier than the second time point, where the first time point is a time point at which the second signaling is sent, and the second time point is a time point at which the semi-persistently scheduled first signal is sent next time.

In a possible implementation, the sending module is further configured to: if the transmit end device needs to semi-persistently schedule third signals, and sending resources corresponding to different types of signals among the third signals collide, send third signaling to the receive end device, and send a fourth signal to the receive end device according to the third signaling, where the third signals include at least two types of signals, the fourth signal is one type of signal among the third signals, and the third signaling is used to indicate that the transmit end device needs to semi-persistently schedule the fourth signal.

In a possible implementation, the transmit end device is any one of the following: a base station, UE, and a sensing server.

The signal transmission apparatus provided in this embodiment of this application may send the first signaling to the receive end device, where the first signaling is used to indicate the configuration information of the first signal; and the configuration information may include at least one of the following: the first information, the signal waveform, the target measurement quantity, and the signal sequence information, where the first information may be used to indicate the signal type of the first signal, or the first information may be used to indicate whether the receive end device detects the communication information of the first signal; and the target measurement quantity may include the measurement quantity to be measured and/or fed back by the receive end device. According to this solution, because the first signaling indicating the configuration information of the first signal may be sent to the receive end device, after the receive end device receives the first signaling, the receive end device can perform differentiated processing on the first signal according to the indication of the first signaling, thereby improving efficiency of signal processing and reducing complexity of processing.

The signal transmission apparatus in this embodiment of this application may be an apparatus, an apparatus with an operating system or the transmit end device, or may be a component, an integrated circuit, or a chip in the transmit end device.

Figure 10:
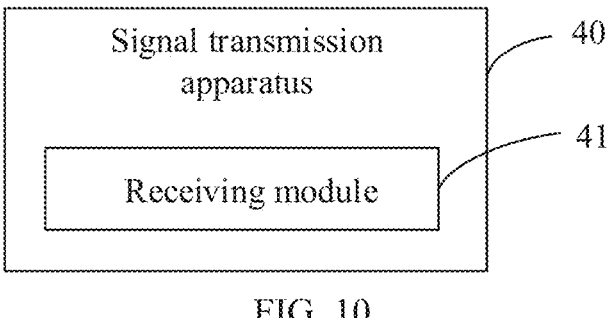
FIG. 10 is a second schematic diagram of a structure of a signal transmission apparatus according to an embodiment of this application.

FIG. 10 is a schematic diagram of a possible structure of a signal transmission apparatus according to an embodiment of this application. As shown in FIG. 10, the signal transmission apparatus 40 may include a receiving module 41. The receiving module 41 is configured to receive first signaling sent by a transmit end device, where the first signaling is used to indicate configuration information of a first signal, and the configuration information is used by a receive end device to process the first signal; and the configuration information includes at least one of the following: first information, a signal waveform, a target measurement quantity, and signal sequence information, where the first information is used to indicate a signal type of the first signal, or indicate whether the receive end device detects communication information of the first signal; a first resource configuration includes at least one of a time-frequency resource configuration and a space resource configuration; and the target measurement quantity includes a measurement quantity to be measured and/or fed back by the receive end device.

In a possible implementation, the configuration information further includes at least one of the following: the first resource configuration, transmit signal power, an MCS, an MCS table, and a CQI table, where the first resource configuration includes at least one of a time-frequency resource configuration and a space resource configuration.

In a possible implementation, the first signal includes at least one of the following types of signals: a sensing signal, a communication signal, and an integrated communication and sensing signal.

In a possible implementation, the receive end device processes the first signal in any one of the following manners:

in a case that the configuration information indicates that the first signal is the sensing signal, skipping restoring the communication information in the first signal, and detecting the sensing signal in the first signal according to the configuration information;

in a case that the configuration information indicates that the first signal includes the integrated communication and sensing signal, restoring the communication information in the first signal, and/or detecting the sensing signal in the first signal according to the configuration information; or in a case that the configuration information indicates that the first signal includes the communication signal, restoring the communication information in the first signal.

In a possible implementation, the signal transmission apparatus 40 provided in this embodiment of this application further includes a sending module. After the receiving module 41 receives the first signaling sent by the transmit end device, the sending module is configured to send feedback information to the transmit end device, where the feedback information is associated with the target measurement quantity.

In a possible implementation, the configuration information does not include the first resource configuration; and after receiving the first signaling sent by the transmit end device, the receiving module 41 is further configured to: skip receiving the first signal, or receive the first signal according to a default format.

In a possible implementation, the receiving module 41 is further configured to: receive second signaling sent by the transmit end device, and receive and process a second signal according to an indication of the second signaling; or receive the first signal semi-persistently scheduled and sent by the transmit end device, where in a process in which the transmit end device semi-persistently schedules the first signal, the second signaling is sent by the transmit end device in a case that the transmit end device needs to dynamically schedule the second signal by using the second signaling and that a first resource collides with a second resource, the second signaling is used to indicate that the transmit end device needs to dynamically schedule the second signal, and the second signal includes at least one type of signal; and the first resource is a sending resource corresponding to the semi-persistently scheduled first signal, and the second resource is a sending resource corresponding to the dynamically scheduled second signal.

In a possible implementation, the receiving module 41 is configured to: in a case that a third time point and a fourth time point meet a second preset time interval and that the third time point is earlier than the fourth time point, receive and process the second signal according to the indication of the second signaling, where the third time point is a time point at which the second signaling is received, and the fourth time point is a time point at which the semi-persistently scheduled first signal is received next time.

In a possible implementation, the receiving module 41 is further configured to: in a case that the third time point and the fourth time point do not meet the second preset time interval, skip receiving and processing the second signal according to the indication of the second signaling, and feed back error information to the transmit end device.

In a possible implementation, the receiving module 41 is further configured to: receive third signaling sent by the transmit end device, and receive and process a fourth signal according to an indication of the third signaling, where the third signaling is sent by the transmit end device in a case that the transmit end device needs to semi-persistently schedule third signals and that sending resources corresponding to different types of signals among the third signals collide, and the third signaling is used to indicate that the transmit end device needs to semi-persistently schedule the fourth signal; and the third signals include at least two types of signals, and the fourth signal is one type of signal among the third signals.

The signal transmission apparatus provided in this application may receive the first signaling sent by the transmit end device, where the first signaling is used to indicate the configuration information of the first signal, and the configuration information is used by the receive end device to process the first signal; and the configuration information includes at least one of the following: the first information, the signal waveform, the target measurement quantity, and the signal sequence information, where the first information is used to indicate the signal type of the first signal, or indicate whether the receive end device detects the communication information of the first signal; the first resource configuration includes at least one of the time-frequency resource configuration and the space resource configuration; and the target measurement quantity includes the measurement quantity to be measured and/or fed back by the receive end device. According to this solution, because the first signaling indicating the configuration information of the first signal and sent by the transmit end device can be received, after the first signaling is received, differentiated processing can be performed on the first signal according to the indication of the first signaling, thereby improving efficiency of signal processing and reducing complexity of processing.

The signal transmission apparatus in this embodiment of this application may be an apparatus, an apparatus with an operating system or the receive end device, or may be a component, an integrated circuit, or a chip in the receive end device.

The signal transmission apparatus provided in this embodiment of this application can implement each process implemented by the foregoing method embodiment, with the same technical effect achieved. To avoid repetition, details are not described herein again.

Figure 11:
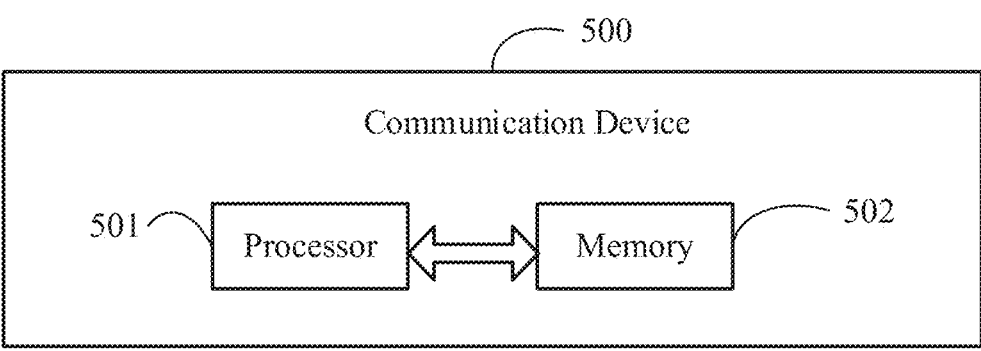
FIG. 11 is a schematic diagram of a hardware structure of a communication device according to an embodiment of this application.

As shown in FIG. 11, an embodiment of this application further provides a communication device 500, including a processor 501, a memory 502, and a program or instructions stored in the memory 502 and capable of running on the processor 501. For example, when the communication device 500 is a transmit end device, and the program or instructions are executed by the processor 501, each process performed by the transmit end device in the foregoing method embodiment is implemented, with the same technical effect achieved. When the communication device 500 is a receive end device, and the program or instructions are executed by the processor 501, each process performed by the receive end device in the foregoing method embodiment is implemented, with the same technical effect achieved. To avoid repetition, details are not described herein again.

An embodiment of this application further provides a transmit end device, including a processor and a communication interface. The communication interface is configured to send first signaling to a receive end device, where the first signaling is used to indicate configuration information of a first signal; and the configuration information includes at least one of the following: first information, a signal waveform, a target measurement quantity, and signal sequence information, where the first information is used to indicate a signal type of the first signal, or indicate whether the receive end device detects communication information of the first signal; and the target measurement quantity includes a measurement quantity to be measured and/or fed back by the receive end device. The embodiment of the transmit end device corresponds to the foregoing embodiment of the transmit end method, and each implementation process and implementation of the foregoing method embodiment can be applied to the transmit end device side embodiment, with the same technical effect achieved.

An embodiment of this application further provides a receive end device, including a processor and a communication interface. The communication interface is configured to: receive first signaling sent by a transmit end device, where the first signaling is used to indicate configuration information of a first signal, and the configuration information is used by the receive end device to process the first signal; and the configuration information includes at least one of the following: first information, a signal waveform, a target measurement quantity, and signal sequence information, where the first information is used to indicate a signal type of the first signal, or indicate whether the receive end device detects communication information of the first signal; a first resource configuration includes at least one of a time-frequency resource configuration and a space resource configuration; and the target measurement quantity includes a measurement quantity to be measured and/or fed back by the receive end device. The embodiment of the receive end device corresponds to the foregoing embodiment of the receive end method, and each implementation process and implementation of the foregoing method embodiment can be applied to the receive end device embodiment, with the same technical effect achieved.

Figure 12:
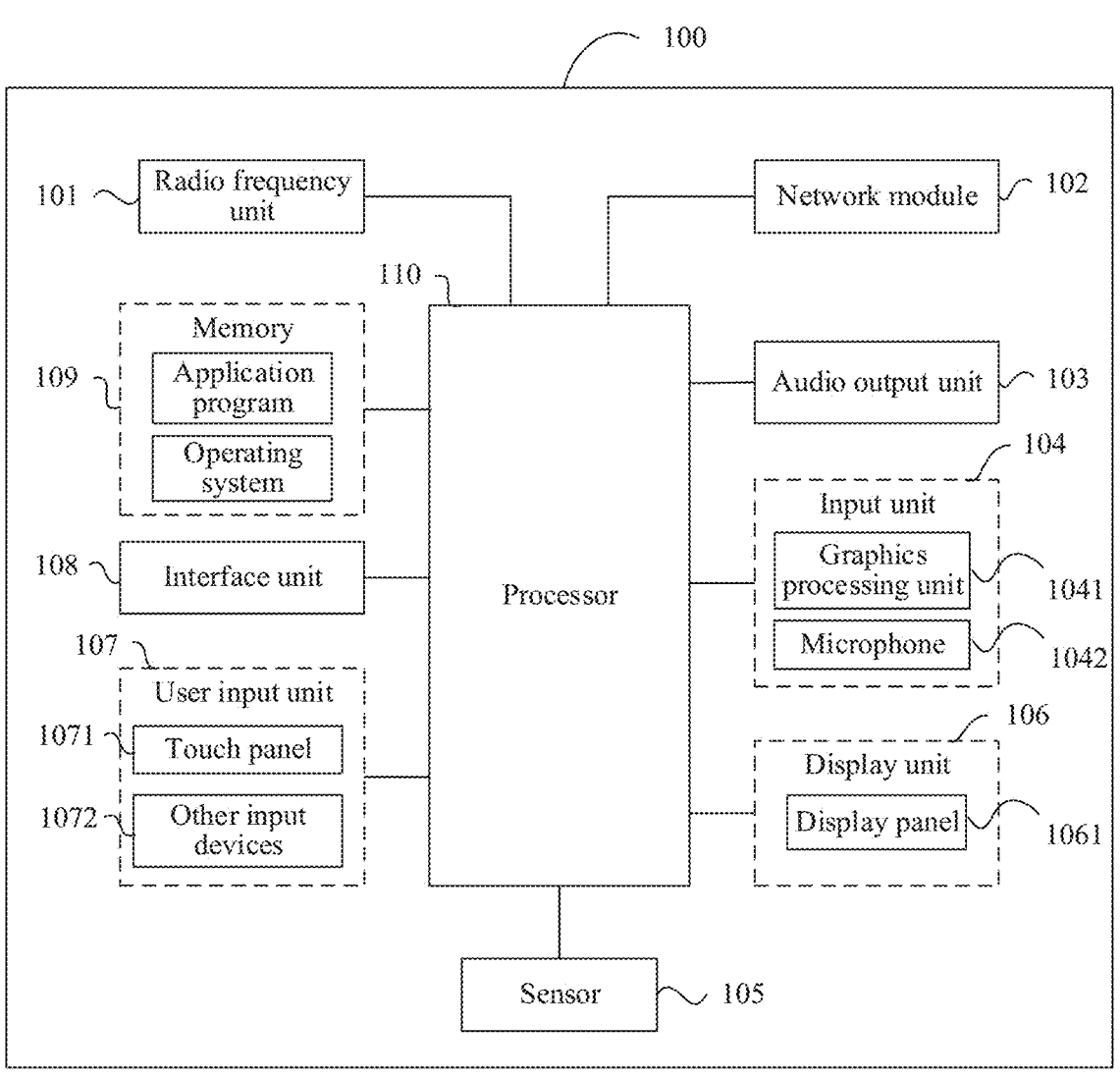
FIG. 12 is a schematic diagram of a hardware structure of UE according to an embodiment of this application.
Figure 13:
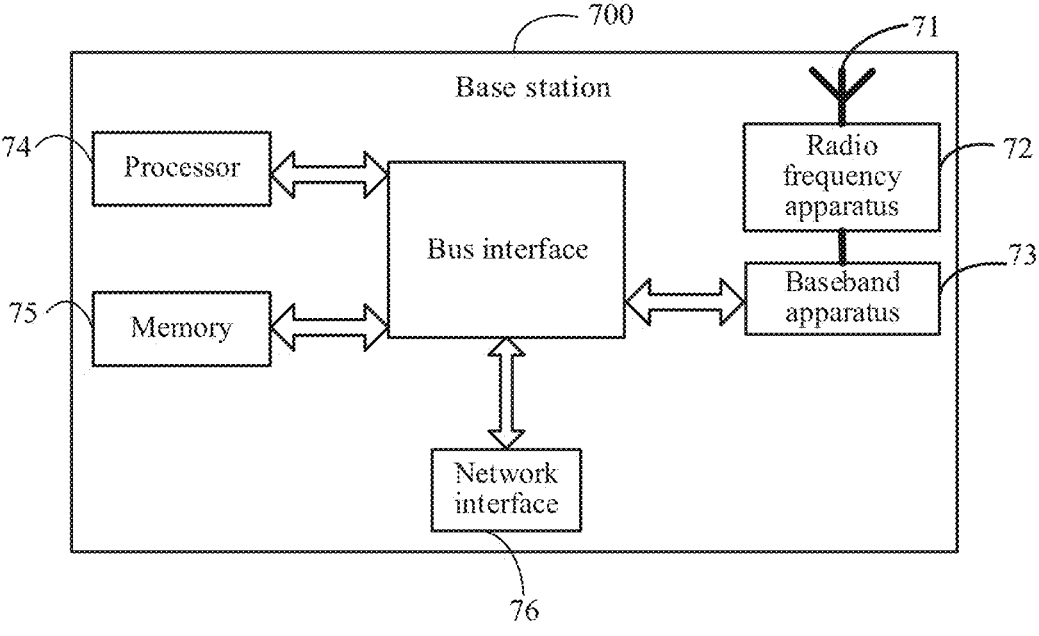
FIG. 13 is a schematic diagram of a hardware structure of a base station according to an embodiment of this application.

It should be noted that the transmit end device in this embodiment of this application may be a base station, UE, or a sensing server; and the receive end device in this embodiment of this application may be a base station or UE. FIG. 12 depicts a hardware structure of a transmit end device and a receive end device by assuming that the transmit end device is UE and that the receive end device is UE. FIG. 13 depicts a hardware structure of a transmit end device and a receive end device by assuming that the transmit end device is a base station and that receive end device is a base station. In some embodiments, the transmit end device and the receive end device may be a combination of other devices (for example, a base station and UE). For the hardware structure of the transmit end device and the receive end device, also refer to the diagram of the hardware structure shown in FIG. 12 or FIG. 13.

FIG. 12 is a schematic diagram of a hardware structure of UE for implementing an embodiment of this application.

The UE 100 includes but is not limited to at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the UE 100 may further include a power supply (such as a battery) for supplying power to the components. The power supply may be logically connected to the processor 110 through a power management system. In this way, functions such as charge management, discharge management, and power consumption management are implemented by using the power management system. The structure of the UE shown in FIG. 12 does not constitute a limitation on the UE. The UE may include more or fewer components than those shown in the figure, or some components are combined, or component arrangements are different. Details are not described herein again.

It should be understood that, in this embodiment of this application, the input unit 104 may include a Graphics Processing Unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical key board, a function key (such as a volume control key or a switch key), a trackball, a mouse, and a joystick. Details are not described herein again.

In this embodiment of this application, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may primarily include a program or instruction storage area and a data storage area. The program or instruction storage area may store an operating system, an application program or instructions (such as an audio play function and an image play function) required by at least one function, and the like. In addition, the memory 109 may include a high-speed random access memory, and may further include a non-volatile memory. The non-volatile memory may be a Read-Only Memory (ROM), a Programmable ROM (PROM), an Erasable PROM (EPROM), an Electrically EPROM (EE-PROM), or a flash memory, for example, at least one disk storage device, a flash memory device, or another non-volatile solid-state storage device.

The processor 110 may include one or more processing units. In some embodiments, the processor 110 may integrate an application processor and a modem processor. The application processor mainly processes the operating system, a user interface, an application program or an instruction, and the like. The modem processor mainly processes wireless communication. For example, the modem processor is a baseband processor. It may be understood that the modem processor may be not integrated in the processor 110.

The radio frequency unit 101 is configured to send first signaling to a receive end device, where the first signaling is used to indicate configuration information of a first signal; and the configuration information includes at least one of the following: first information, a signal waveform, a target measurement quantity, and signal sequence information, where the first information is used to indicate a signal type of the first signal, or indicate whether the receive end device detects communication information of the first signal; and the target measurement quantity includes a measurement quantity to be measured and/or fed back by the receive end device.

According to the UE provided in this embodiment of this application, the UE may send the first signaling to the receive end device, where the first signaling is used to indicate the configuration information of the first signal; and the configuration information may include at least one of the following: the first information, the signal waveform, the target measurement quantity, and the signal sequence information, where the first information may be used to indicate the signal type of the first signal, or the first information may be used to indicate whether the receive end device detects the communication information of the first signal; and the target measurement quantity may include the measurement quantity to be measured and/or fed back by the receive end device. According to this solution, because the first signaling indicating the configuration information of the first signal may be sent to the receive end device, after the receive end device receives the first signaling, the receive end device can perform differentiated processing on the first signal according to the indication of the first signaling, thereby improving efficiency of signal processing and reducing complexity of processing.

In some embodiments, the radio frequency unit 101 is configured to receive first signaling sent by a transmit end device, where the first signaling is used to indicate configuration information of a first signal, and the configuration information is used by the receive end device to process the first signal; and the configuration information includes at least one of the following: first information, a signal waveform, a target measurement quantity, and signal sequence information, where the first information is used to indicate a signal type of the first signal, or indicate whether the receive end device detects communication information of the first signal; a first resource configuration includes at least one of a time-frequency resource configuration and a space resource configuration; and the target measurement quantity includes a measurement quantity to be measured and/or fed back by the receive end device.

According to the UE provided in this embodiment of this application, the UE may receive the first signaling sent by the transmit end device, where the first signaling is used to indicate the configuration information of the first signal, and the configuration information is used by the receive end device to process the first signal; and the configuration information includes at least one of the following: the first information, the signal waveform, the target measurement quantity, and the signal sequence information, where the first information is used to indicate the signal type of the first signal, or indicate whether the receive end device detects the communication information of the first signal; the first resource configuration includes at least one of the time-frequency resource configuration and the space resource configuration; and the target measurement quantity includes the measurement quantity to be measured and/or fed back by the receive end device. According to this solution, because the first signaling indicating the configuration information of the first signal and sent by the transmit end device can be received, after the first signaling is received, differentiated processing can be performed on the first signal according to the indication of the first signaling, thereby improving efficiency of signal processing and reducing complexity of processing.

The UE provided in this embodiment of this application can implement each process implemented by the transmit end device or the receive end device in the foregoing method embodiment, with the same technical effect achieved. To avoid repetition, details are not described herein again.

An embodiment of this application further provides a base station. As shown in FIG. 13, the base station 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

A frequency band processing apparatus may be located in the baseband apparatus 73. The method performed by the transmit end device or the receive end device in the foregoing embodiment may be implemented in the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 13, one of the chips is, for example, the processor 74, connected to the memory 75, to invoke a program in the memory 75 to perform the operation of the transmit end device or the receive end device shown in the foregoing method embodiment.

The baseband apparatus 73 may further include a network interface 76, configured to exchange information with the radio frequency apparatus 72, where the interface is, for example, a Common Public Radio Interface (CPRI).

The base station in this embodiment of the present application further includes a program or instructions stored in the memory 75 and capable of running on the processor 74. When the processor 74 invokes the program or instructions in the memory 75, the method performed by each module is performed, with the same technical effect achieved. To avoid repetition, details are not described herein again.

The radio frequency apparatus 72 is configured to send first signaling to a receive end device, where the first signaling is used to indicate configuration information of a first signal; and the configuration information includes at least one of the following: first information, a signal waveform, a target measurement quantity, and signal sequence information, where the first information is used to indicate a signal type of the first signal, or indicate whether the receive end device detects communication information of the first signal; and the target measurement quantity includes a measurement quantity to be measured and/or fed back by the receive end device.

According to the base station provided in this embodiment of this application, the base station may send the first signaling to the receive end device, where the first signaling is used to indicate the configuration information of the first signal; and the configuration information may include at least one of the following: the first information, the signal waveform, the target measurement quantity, and the signal sequence information, where the first information may be used to indicate the signal type of the first signal, or the first information may be used to indicate whether the receive end device detects the communication information of the first signal; and the target measurement quantity may include the measurement quantity to be measured and/or fed back by the receive end device. According to this solution, because the first signaling indicating the configuration information of the first signal may be sent to the receive end device, after the receive end device receives the first signaling, the receive end device can perform differentiated processing on the first signal according to the indication of the first signaling, thereby improving efficiency of signal processing and reducing complexity of processing.

In some embodiments, the radio frequency apparatus 72 is configured to receive first signaling sent by a transmit end device, where the first signaling is used to indicate configuration information of a first signal, and the configuration information is used by the receive end device to process the first signal, and the configuration information includes at least one of the following: first information, a signal waveform, a target measurement quantity, and signal sequence information, where the first information is used to indicate a signal type of the first signal, or indicate whether the receive end device detects communication information of the first signal; a first resource configuration includes at least one of a time-frequency resource configuration and a space resource configuration; and the target measurement quantity includes a measurement quantity to be measured and/or fed back by the receive end device.

According to the base station provided in this embodiment of this application, the base station may receive the first signaling sent by the transmit end device, where the first signaling is used to indicate the configuration information of the first signal, and the configuration information is used by the receive end device to process the first signal; and the configuration information includes at least one of the following: the first information, the signal waveform, the target measurement quantity, and the signal sequence information, where the first information is used to indicate the signal type of the first signal, or indicate whether the receive end device detects the communication information of the first signal; the first resource configuration includes at least one of the time-frequency resource configuration and the space resource configuration; and the target measurement quantity includes the measurement quantity to be measured and/or fed back by the receive end device. According to this solution, because the first signaling indicating the configuration information of the first signal and sent by the transmit end device can be received, after the first signaling is received, differentiated processing can be performed on the first signal according to the indication of the first signaling, thereby improving efficiency of signal processing and reducing complexity of processing.

The base station provided in this embodiment of this application can implement each process implemented by the transmit end device or the receive end device in the foregoing method embodiment, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the signal transmission method is implemented, with the same technical effect achieved. To avoid repetition, details are not described herein again.

The processor is a processor in the UE in the foregoing embodiment. The readable storage medium includes a computer-readable storage medium, for example, a computer Read-Only Memory (ROM), a Random Access Memory (RAM), a magnetic disk, or an optical disc.

In addition, an embodiment of this application provides a chip. The chip includes a processor and a communication interface. The communication interface is coupled to the processor. The processor is configured to run a program or instructions to implement each process of the embodiment of the signal transmission method, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and may be implemented by using hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A method for signal transmission, comprising:
sending, by a transmit end device, first signaling to a receive end device, wherein the first signaling is used to indicate configuration information of a first signal; and
the configuration information comprises at least one of the following: first information, a signal waveform, a target measurement quantity, or signal sequence information, wherein the first information is used to indicate a signal type of the first signal, or indicate whether the receive end device detects communication information of the first signal; and the target measurement quantity comprises a measurement quantity to be measured or fed back by the receive end device, in a process in which the transmit end device semi-persistently schedules the first signal by using the first signaling, when the transmit end device needs to dynamically schedule a second signal by using second signaling, and a first resource collides with a second resource, the method further comprising:

sending the second signaling to the receive end device, and canceling sending the semi-persistently scheduled first signal to the receive end device; or skipping sending the second signaling to the receive end device, and continuing to send the semi-persistently scheduled first signal to the receive end device, wherein the second signal comprises at least one type of signal, the first resource is a sending resource corresponding to the semi-persistently scheduled first signal, and the second resource is a sending resource corresponding to the dynamically scheduled second signal.

2. The method according to claim 1, wherein the configuration information further comprises at least one of the following: a first resource configuration, transmit signal power, a modulation and coding scheme (MCS), an MCS table, or a channel quality indicator (CQI) table, wherein the first resource configuration comprises at least one of a time-frequency resource configuration or a space resource configuration.

3. The method according to claim 1, wherein the target measurement quantity comprises at least one of channel-related information or sensing-related information;

the channel-related information comprises at least one of the following: a channel matrix H, channel state information (CSI), power of each path in a multipath channel, a delay of each path, an angle of each path, Doppler spread, a Doppler frequency shift, a phase difference between a first antenna and a second antenna, or a delay difference between the first antenna and the second antenna; and the sensing-related information comprises at least one of the following: characteristic information of a target object, related information of a target event, or related information of a target environment, wherein the first antenna and the second antenna are different antennas in the receive end device for receiving the first signal, the target object is an object sensed by detecting the first signal, the target event is an event sensed by detecting the first signal, and the target environment is an environment sensed by detecting the first signal.

4. The method according to claim 1, wherein the target measurement quantity comprises at least one of the following: a measurement quantity on each antenna or antenna port that sends the first signal in the transmit end device, a measurement quantity on each antenna or antenna port that receives the first signal in the receive end device, or a measurement quantity on each sensing resource in the first signal, wherein the sensing resource is a resource block (RB), a subcarrier, or an RB group.

5. The method according to claim 1, wherein the first signaling is further used to indicate related information of a feedback channel, and the related information of the feedback channel comprises at least one of the following: a transmission format of the feedback channel, a time domain resource of the feedback channel, or a frequency domain resource of the feedback channel, wherein the feedback channel is a channel used when the receive end device sends feedback information, and the feedback information is associated with the target measurement quantity.

6. The method according to claim 1, wherein after sending the first signaling to the receive end device, the method further comprises:

receiving, by the transmit end device, feedback information sent by the receive end device, wherein the feedback information is associated with the target measurement quantity.

7. The method according to claim 1, wherein the first signaling is any one of the following: higher layer signaling, media access control-control element (MAC CE) signaling, or layer 1 signaling, wherein when the layer 1 signaling is downlink control information (DCI) signaling, the configuration information is indicated by any one of the following: a specific field reused in the DCI signaling, a specific field added to the DCI signaling, different modes for scrambling the DCI signaling, or a specific DCI format.

8. The method according to claim 1, wherein the configuration information comprises at least two pieces of second information, and each piece of second information is any one of the following: the first information, the signal waveform, or the signal sequence information; and when an association relationship exists between the at least two pieces of second information, the first signaling is used to indicate at least one of the at least two pieces of second information or indicate index information related to the at least two pieces of second information.

9. The method according to claim 1, wherein a first time point and a second time point meet a first preset time interval, and the first time point is earlier than the second time point, wherein the first time point is a time point at which the second signaling is sent, and the second time point is a time point at which the semi-persistently scheduled first signal is sent next time.

10. The method according to claim 1, further comprising:

when the transmit end device needs to semi-persistently schedule third signals, and sending resources corresponding to different types of signals among the third signals collide, sending third signaling to the receive end device, and sending a fourth signal to the receive end device according to the third signaling, wherein the third signals comprise at least two types of signals, the fourth signal is one type of signal among the third signals, and the third signaling is used to indicate that the transmit end device needs to semi-persistently schedule the fourth signal.

11. A method for signal transmission, comprising:

receiving, by a receive end device, first signaling sent by a transmit end device, wherein the first signaling is used to indicate configuration information of a first signal, and the configuration information is used by the receive end device to process the first signal; and the configuration information comprises at least one of the following: first information, a signal waveform, a target measurement quantity, or signal sequence information, wherein the first information is used to indicate a signal type of the first signal, or indicate whether the receive end device detects communication information of the first signal; a first resource configuration comprises at least one of a time-frequency resource configuration or a space resource configuration; and the target measurement quantity comprises a measurement quantity to be measured or fed back by the receive end device wherein the receive end device processes the first signal in one of the following manners:

when the configuration information indicates that the first signal is a sensing signal, skipping restoring the communication information in the first signal, and detecting the sensing signal in the first signal according to the configuration information;

when the configuration information indicates that the first signal comprises an integrated communication and sensing signal, restoring the communication information in the first signal, or detecting the sensing signal in the first signal according to the configuration information; or when the configuration information indicates that the first signal comprises a communication signal, restoring the communication information in the first signal.

12. The method according to claim 11, wherein after receiving the first signaling sent by the transmit end device, the method further comprises:

sending feedback information to the transmit end device, wherein the feedback information is associated with the target measurement quantity.

13. The method according to claim 11, wherein the configuration information does not comprise the first resource configuration; and after receiving the first signaling sent by the transmit end device, the method further comprises:

skipping receiving, by the receive end device, the first signal, or receiving the first signal according to a default format.

14. The method according to claim 11, further comprising:

receiving, by the receive end device, second signaling sent by the transmit end device, and receiving and processing a second signal according to an indication of the second signaling; or receiving, by the receive end device, the first signal semi-persistently scheduled and sent by the transmit end device, wherein in a process in which the transmit end device semi-persistently schedules the first signal, the second signaling is sent by the transmit end device when the transmit end device needs to dynamically schedule the second signal by using the second signaling and when a first resource collides with a second resource, the second signaling is used to indicate that the transmit end device needs to dynamically schedule the second signal, and the second signal comprises at least one type of signal; and the first resource is a sending resource corresponding to the semi-persistently scheduled first signal, and the second resource is a sending resource corresponding to the dynamically scheduled second signal.

15. The method according to claim 14, wherein receiving and processing the second signal according to the indication of the second signaling comprises:

when a third time point and a fourth time point meet a second preset time interval and the third time point is earlier than the fourth time point, receiving and processing, by the receive end device, the second signal according to the indication of the second signaling, wherein the third time point is a time point at which the second signaling is received, and the fourth time point is a time point at which the semi-persistently scheduled first signal is received next time.

16. The method according to claim 15, further comprising:

when the third time point and the fourth time point do not meet the second preset time interval, skipping receiving and processing, by the receive end device, the second signal according to the indication of the second signaling, and feeding back error information to the transmit end device.

17. The method according to claim 11, further comprising:

receiving, by the receive end device, third signaling sent by the transmit end device, and receiving and processing a fourth signal according to an indication of the third signaling, wherein the third signaling is sent by the transmit end device when the transmit end device needs to semi-persistently schedule third signals and sending resources corresponding to different types of signals among the third signals collide, and the third signaling is used to indicate that the transmit end device needs to semi-persistently schedule the fourth signal; and the third signals comprise at least two types of signals, and the fourth signal is one type of signal among the third signals.

18. A receive end device, comprising: a memory storing a computer program; and a processor coupled to the memory and configured to execute the computer program to perform the method for signal transmission according to claim 11.

19. A transmit end device, comprising: a memory storing a computer program; and a processor coupled to the memory and configured to execute the computer program to perform operations comprising:

sending, by the transmit end device, first signaling to a receive end device, wherein the first signaling is used to indicate configuration information of a first signal; and the configuration information comprises at least one of the following: first information, a signal waveform, a target measurement quantity, or signal sequence information, wherein the first information is used to indicate a signal type of the first signal, or indicate whether the receive end device detects communication information of the first signal; and the target measurement quantity comprises a measurement quantity to be measured or fed back by the receive end device, in a process in which the transmit end device semi-persistently schedules the first signal by using the first signaling, when the transmit end device needs to dynamically schedule a second signal by using second signaling, and a first resource collides with a second resource, the transmit end device is configured to further perform:

sending the second signaling to the receive end device, and canceling sending the semi-persistently scheduled first signal to the receive end device; or skipping sending the second signaling to the receive end device, and continuing to send the semi-persistently scheduled first signal to the receive end device, wherein the second signal comprises at least one type of signal, the first resource is a sending resource corresponding to the semi-persistently scheduled first signal, and the second resource is a sending resource corresponding to the dynamically scheduled second signal.

\* \* \* \* \*